United States Patent
Li et al.

(10) Patent No.: US 10,530,547 B2
(45) Date of Patent: Jan. 7, 2020

(54) DATA COMMUNICATION METHOD, TERMINAL, AND BASE STATION

(71) Applicant: Huawei Technologies Co., Ltd., Shenzhen (CN)

(72) Inventors: Junchao Li, Shanghai (CN); Hao Tang, Shanghai (CN); Zhenfei Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/204,756

(22) Filed: Nov. 29, 2018

(65) Prior Publication Data

US 2019/0097774 A1 Mar. 28, 2019

Related U.S. Application Data

(63) Continuation of application No. PCT/CN2018/096634, filed on Jul. 23, 2018.

(30) Foreign Application Priority Data

Aug. 10, 2017 (CN) .......................... 2017 1 0682190

(51) Int. Cl.
    *H04L 5/00* (2006.01)
    *H04W 72/12* (2009.01)
    (Continued)

(52) U.S. Cl.
    CPC ............. *H04L 5/0048* (2013.01); *H04L 1/00* (2013.01); *H04L 5/00* (2013.01); *H04W 24/00* (2013.01);
    (Continued)

(58) Field of Classification Search
    CPC ............ H04L 5/0048; H04W 72/1278; H04W 88/02; H04W 88/08
    See application file for complete search history.

(56) References Cited

U.S. PATENT DOCUMENTS

2011/0170435 A1 7/2011 Kim et al.
2015/0009948 A1* 1/2015 Raaf ..................... H04W 48/16
                                                      370/330
(Continued)

FOREIGN PATENT DOCUMENTS

CN          103516474 A      1/2014
CN          103686772 A      3/2014
(Continued)

OTHER PUBLICATIONS

Ericsson, "NB-IoT—Remaining issues for NPBCH and MIB," 3GPP TSG RAN WG1 NB-IoT Ad-Hoc Meeting, R1-161820, Sophia Antipolis, France, Mar. 22-24, 2016, 6 pages.

(Continued)

*Primary Examiner* — Luat Phung
(74) *Attorney, Agent, or Firm* — Slater Matsil, LLP

(57) ABSTRACT

This application provides a data communication method, a terminal, and a base station. In one embodiment, the terminal receives a first demodulation reference signal based on a first physical resource block index. The first physical resource block index is determined based on a first location in frequency domain, and the first demodulation reference signal is used to demodulate a data channel on which system information is located. The terminal sends and/or receives a second demodulation reference signal based on a second physical resource block index. The second physical resource block index is determined based on a second location in frequency domain, and the second demodulation reference signal is used to demodulate a data channel other than the data channel on which the system information is located.

30 Claims, 16 Drawing Sheets

(51) Int. Cl.
*H04L 1/00* (2006.01)
*H04W 24/00* (2009.01)
*H04W 72/04* (2009.01)
*H04W 88/08* (2009.01)
*H04W 88/02* (2009.01)

(52) U.S. Cl.
CPC .......... *H04W 72/04* (2013.01); *H04W 72/12* (2013.01); *H04W 72/1278* (2013.01); *H04W 88/02* (2013.01); *H04W 88/08* (2013.01)

(56) References Cited

U.S. PATENT DOCUMENTS

| | | | |
|---|---|---|---|
| 2015/0063281 A1* | 3/2015 | Xu | H04W 16/02 370/329 |
| 2015/0223210 A1 | 8/2015 | Guo et al. | |
| 2016/0192348 A1 | 6/2016 | Dai et al. | |
| 2018/0227897 A1 | 8/2018 | Yeo et al. | |
| 2018/0331799 A1* | 11/2018 | Zhang | H04L 5/0023 |
| 2019/0029005 A1* | 1/2019 | Bendlin | H04W 72/042 |
| 2019/0044690 A1* | 2/2019 | Yi | H04L 5/14 |

FOREIGN PATENT DOCUMENTS

| | | |
|---|---|---|
| CN | 106961734 A | 7/2017 |
| WO | 2017014613 A1 | 1/2017 |

OTHER PUBLICATIONS

3rd Generation Partnership Project; Technical Specification Group Radio Access Network; NR; Physical channels and modulation (Release 15), 3GPP TS 38.211 V0.1.0 (Jun. 2017), 22 pages.

3rd Generation Partnership Project; Technical Specification Group Radio Access Network; NR; Radio Resource Control (RRC); Protocol specification (Release 15 ), 3GPP TS 38.331 V0.0.4 (Jun. 2017), 22 pages.

ETRI, "UE bandwidth configuration during initial access," 3GPP TSG RAN WG1 NR Ad-Hoc#2, R1-1710622, Qingdao, China, Jun. 27-30, 2017, 5 pages.

Samsung, "Wider Bandwidth Operations," 3GPP TSG RAN WG1 NR Ad-Hoc#2, R1-1710761, Qingdao, P.R. China Jun. 27-30, 2017, 8 pages.

Huawei et al., "Common UL/DL DMRS design", 3GPP TSG RAN WG1 NR Ad Hoc Meeting, R1-1709945, Qingdao, China, Jun. 27-30, 2017, 4 pages.

* cited by examiner

DATA COMMUNICATION METHOD, TERMINAL, AND BASE STATION

CROSS-REFERENCE TO RELATED APPLICATIONS

This application is a continuation of International Application No. PCT/CN2018/096634, filed on Jul. 23, 2018, which claims priority to Chinese Patent Application No. 201710682190.3, filed on Aug. 10, 2017. The disclosures of the aforementioned applications are hereby incorporated by reference in their entireties.

TECHNICAL FIELD

This application relates to the field of communications technologies, and in particular, to a data communication method, a terminal, and a base station.

BACKGROUND

In a wireless communications system, a terminal usually transmits and/or receives a reference signal and data channel information based on a physical resource block (PRB) index. In a long term evolution (LTE) system, because a synchronization signal is usually located on intermediate 72 subcarriers of a downlink carrier, the terminal may determine a central location of the downlink carrier by performing blinding detection on the synchronization signal, so that a PRB index can be determined based on a (maximum) carrier bandwidth, and the terminal can transmit and/or receive the reference signal and the data channel information based on the PRB index.

However, in new radio (NR), the synchronization signal is not necessarily located in the middle of the downlink carrier, the terminal cannot learn of the central location of the carrier, and one carrier may include a plurality of synchronization signals in frequency domain. Therefore, how to determine a PRB index to ensure correct communication between a base station and a terminal is a technical problem that needs to be resolved urgently.

SUMMARY

Embodiments of this application provide a data communication method, a terminal, and a base station, so as to determine a PRB index to ensure correct communication between a base station and a terminal.

A first aspect of this application provides a data communication method, including:

receiving, by a terminal, common information based on a first physical resource block index, where the first physical resource block index is determined based on a first bandwidth and/or a first location in frequency domain; and transmitting and/or receiving, by the terminal, terminal-specific information based on a second physical resource block index, where the second physical resource block index is determined based on a second bandwidth and/or a second location in frequency domain.

In this solution, the first PRB index is a PRB index used before a connection is established between the terminal and a base station, or the first PRB index is a PRB index used before the terminal receives a system information block (SIB). In addition, the terminal may receive, based on the first PRB index, common information sent by the base station. The first PRB index may be determined based on only the first bandwidth, or may be determined based on only the first location, or may be determined based on the first bandwidth and the first location.

In the foregoing solution, the terminal receives the common information based on the first PRB index, and transmits and/or receives the terminal-specific information based on the second PRB index. The first PRB index is determined based on the first bandwidth and/or the first location in frequency domain, and the second PRB index is determined based on the second bandwidth and/or the second location in frequency domain. The terminal may determine the first PRB index based on the first bandwidth and/or the first location in frequency domain, and determine the second PRB index based on the second bandwidth and/or the second location in frequency domain, and the terminal may separately receive the common information and transmit and/or receive the terminal-specific information based on different PRB indexes. Therefore, the terminal can determine a PRB index, and transmit and/or receive a reference signal and data channel information to the base station based on the determined PRB index.

Optionally, the first location is a frequency domain location of a synchronization signal block or is determined based on first information, and the second location is a carrier central location or is determined based on second information.

Optionally, the first information is indicated by using a master information block.

Optionally, the second information is indicated by using a master information block, a system information block, or radio resource control signaling.

Optionally, the first bandwidth is not greater than a minimum terminal bandwidth capability, or is determined based on a minimum terminal bandwidth capability or based on a maximum carrier bandwidth, and the second bandwidth is determined based on the maximum carrier bandwidth.

In this solution, the minimum terminal bandwidth capability is a minimum value of maximum bandwidth capabilities of all terminals, and a maximum bandwidth capability of a terminal is a maximum bandwidth that can be supported by the terminal, to be specific, a maximum quantity of PRB blocks that can be simultaneously transmitted and/or received by the terminal. A maximum downlink carrier bandwidth is a maximum quantity of PRBs that are included in a downlink carrier or a quantity of PRBs that can be simultaneously sent by the base station.

Optionally, the first bandwidth is not greater than a minimum terminal bandwidth capability, or is determined based on a minimum terminal bandwidth capability or based on a maximum carrier bandwidth, and the second bandwidth is a size of a carrier bandwidth part.

In this solution, a maximum downlink carrier bandwidth is a maximum quantity of PRBs that are included in a downlink carrier or a quantity of PRBs that can be simultaneously sent by the base station. The minimum terminal bandwidth capability is a minimum value of maximum bandwidth capabilities of all terminals, and a maximum bandwidth capability of a terminal is a maximum bandwidth that can be supported by the terminal, to be specific, a maximum quantity of PRB blocks that can be simultaneously transmitted and/or received by the terminal.

Optionally, the maximum carrier bandwidth is determined based on a subcarrier spacing.

Optionally, the common information includes at least one piece of the following information: a reference signal for demodulating common control information, a reference signal for demodulating common data channel information, the common control information, or the common data channel information.

Optionally, the terminal-specific information includes at least one piece of the following information: a reference signal for demodulating terminal-specific control information, a reference signal for demodulating terminal-specific data channel information, and a channel measurement reference signal.

Optionally, the method further includes:
determining, by the terminal based on the second physical resource block index, a carrier bandwidth part for scheduling terminal-specific data channel information.

In the foregoing solution, the carrier bandwidth part is a part of a channel bandwidth. The carrier bandwidth part may be a bandwidth determined in a first step of two-level resource allocation during data communication, and may be a segment of consecutive resources in frequency domain.

Optionally, after the determining, by the terminal based on the second physical resource block index, a carrier bandwidth part for scheduling terminal-specific data channel information, the method further includes:
transmitting and/or receiving, by the terminal within the carrier bandwidth part, a physical resource for transmitting the terminal-specific data channel information.

A second aspect of this application provides a data communication method, including:
sending, by a base station, common information based on a first physical resource block index, where the first physical resource block index is determined based on a first bandwidth and/or a first location in frequency domain; and
transmitting and/or receiving, by the base station, terminal-specific information based on a second physical resource block index, where the second physical resource block index is determined based on a second bandwidth and/or a second location in frequency domain.

In this solution, the first PRB index is a PRB index used before a connection is established between a terminal and the base station, or the first PRB index is a PRB index used before a terminal receives a SIB. In addition, the base station may send the common information to the terminal based on the first PRB index. The first PRB index may be determined based on only the first bandwidth, or may be determined based on only the first location, or may be determined based on the first bandwidth and the first location.

In the foregoing solution, the base station sends the common information to the terminal based on the first PRB index, and transmits and/or receives the terminal-specific information based on the second PRB index. The first PRB index is determined based on the first bandwidth and/or the first location in frequency domain, and the second PRB index is determined based on the second bandwidth and/or the second location in frequency domain. The base station may determine the first PRB index based on the first bandwidth and/or the first location in frequency domain, and determine the second PRB index based on the second bandwidth and/or the second location in frequency domain, and the base station may separately send the common information, and transmit and/or receive the terminal-specific information based on different PRB indexes. Therefore, the base station may determine a PRB index, and transmit and/or receive a reference signal and data channel information to the terminal based on the determined PRB index.

Optionally, the first location is a frequency domain location of a synchronization signal block or is determined based on first information, and the second location is a carrier central location or is determined based on second information.

Optionally, the first information is indicated by using a master information block.

Optionally, the second information is indicated by using a master information block, a system information block, or radio resource control signaling.

Optionally, the first bandwidth is not greater than a minimum terminal bandwidth capability, or is determined based on a minimum terminal bandwidth capability or based on a maximum carrier bandwidth, and the second bandwidth is determined based on the maximum carrier bandwidth.

In this solution, the minimum terminal bandwidth capability is a minimum value of maximum bandwidth capabilities of all terminals, and a maximum bandwidth capability of a terminal is a maximum bandwidth that can be supported by the terminal, to be specific, a maximum quantity of PRB blocks that can be simultaneously transmitted and/or received by the terminal. A maximum downlink carrier bandwidth is a maximum quantity of PRBs that are included in a downlink carrier or a quantity of PRBs that can be simultaneously sent by the base station.

Optionally, the first bandwidth is not greater than a minimum terminal bandwidth capability, or is determined based on a minimum terminal bandwidth capability or based on a maximum carrier bandwidth, and the second bandwidth is a size of a carrier bandwidth part.

In this solution, a maximum downlink carrier bandwidth is a maximum quantity of PRBs that are included in a downlink carrier or a quantity of PRBs that can be simultaneously sent by the base station. The minimum terminal bandwidth capability is a minimum value of maximum bandwidth capabilities of all terminals, and a maximum bandwidth capability of a terminal is a maximum bandwidth that can be supported by the terminal, to be specific, a maximum quantity of PRB blocks that can be simultaneously transmitted and/or received by the terminal.

Optionally, the maximum carrier bandwidth is determined based on a subcarrier spacing.

Optionally, the common information includes at least one piece of the following information: a reference signal for demodulating common control information, a reference signal for demodulating common data channel information, the common control information, and the common data channel information.

Optionally, the terminal-specific information includes at least one piece of the following information: a reference signal for demodulating terminal-specific control information, a reference signal for demodulating terminal-specific data channel information, and a channel measurement reference signal.

Optionally, the method further includes:
determining, by the base station based on the second physical resource block index, a carrier bandwidth part for scheduling terminal-specific data channel information.

Optionally, after the determining, by the base station based on the second physical resource block index, a carrier bandwidth part for scheduling terminal-specific data channel information, the method further includes:
transmitting and/or receiving, by the base station within the carrier bandwidth part, a physical resource for transmitting the terminal-specific data channel information.

A third aspect of this application provides a terminal, including:
a receiving module, configured to receive common information based on a first physical resource block index, where the first physical resource block index is determined based on a first bandwidth and/or a first location in frequency domain; and a communication module, configured to transmit and/or receive terminal-specific information based on a second physical resource block index, where the second physical resource block index is determined based on a second bandwidth and/or a second location in frequency domain.

Optionally, the first location is a frequency domain location of a synchronization signal block or is determined based on first information, and the second location is a carrier central location or is determined based on second information.

Optionally, the first information is indicated by using a master information block.

Optionally, the second information is indicated by using a master information block, a system information block, or radio resource control signaling.

Optionally, the first bandwidth is not greater than a minimum terminal bandwidth capability, or is determined based on a minimum terminal bandwidth capability or based on a maximum carrier bandwidth, and the second bandwidth is determined based on the maximum carrier bandwidth.

Optionally, the first bandwidth is not greater than a minimum terminal bandwidth capability, or is determined based on a minimum terminal bandwidth capability or based on a maximum carrier bandwidth, and the second bandwidth is a size of a carrier bandwidth part.

Optionally, the maximum carrier bandwidth is determined based on a subcarrier spacing.

Optionally, the common information includes at least one piece of the following information: a reference signal for demodulating common control information, a reference signal for demodulating common data channel information, the common control information, and the common data channel information.

Optionally, the terminal-specific information includes at least one piece of the following information: a reference signal for demodulating terminal-specific control information, a reference signal for demodulating terminal-specific data channel information, and a channel measurement reference signal.

Optionally, the apparatus further includes:

a determining module, configured to determine, based on the second physical resource block index, a carrier bandwidth part for scheduling terminal-specific data channel information.

Optionally, the communication module is further configured to transmit and/or receive, within the carrier bandwidth part, a physical resource for transmitting the terminal-specific data channel information.

A fourth aspect of this application provides a base station, including:

a sending module, configured to send common information based on a first physical resource block index, where the first physical resource block index is determined based on a first bandwidth and/or a first location in frequency domain; and a communication module, configured to transmit and/or receive terminal-specific information based on a second physical resource block index, where the second physical resource block index is determined based on a second bandwidth and/or a second location in frequency domain.

Optionally, the first location is a frequency domain location of a synchronization signal block or is determined based on first information, and the second location is a carrier central location or is determined based on second information.

Optionally, the first information is indicated by using a master information block.

Optionally, the second information is indicated by using a master information block, a system information block, or radio resource control signaling.

Optionally, the first bandwidth is not greater than a minimum terminal bandwidth capability, or is determined based on a minimum terminal bandwidth capability or based on a maximum carrier bandwidth, and the second bandwidth is determined based on the maximum carrier bandwidth.

Optionally, the first bandwidth is not greater than a minimum terminal bandwidth capability, or is determined based on a minimum terminal bandwidth capability or based on a maximum carrier bandwidth, and the second bandwidth is a size of a carrier bandwidth part.

Optionally, the maximum carrier bandwidth is determined based on a subcarrier spacing.

Optionally, the common information includes at least one piece of the following information: a reference signal for demodulating common control information, a reference signal for demodulating common data channel information, the common control information, and the common data channel information.

Optionally, the terminal-specific information includes at least one piece of the following information: a reference signal for demodulating terminal-specific control information, a reference signal for demodulating terminal-specific data channel information, and a channel measurement reference signal.

Optionally, the apparatus further includes:

a determining module, configured to determine, based on the second physical resource block index, a carrier bandwidth part for scheduling terminal-specific data channel information.

Optionally, the communication module is further configured to transmit and/or receive, within the carrier bandwidth part, a physical resource for transmitting the terminal-specific data channel information.

A fifth aspect of the embodiments of this application provides a data communication apparatus, and the apparatus includes a processor and a memory. The memory is configured to store a program. The processor invokes the program stored in the memory, to perform the method provided in the first aspect of this application. The data communication apparatus may be a terminal chip.

A sixth aspect of the embodiments of this application provides a data communication apparatus, and the apparatus includes a processor and a memory. The memory is configured to store a program. The processor invokes the program stored in the memory, to perform the method provided in the second aspect of this application. The data communication apparatus may be a base station chip.

A seventh aspect of the embodiments of this application provides a terminal, including at least one processing element (or a chip) for performing the method in the first aspect.

An eighth aspect of the embodiments of this application provides a base station, including at least one processing element (or a chip) for performing the method in the second aspect.

A ninth aspect of the embodiments of this application provides a data communication program, and the program is executed by a processor to perform the method in the first aspect.

A tenth aspect of the embodiments of this application provides a program product, for example, a computer readable storage medium, including the program in the ninth aspect.

An eleventh aspect of the embodiments of this application provides a data communication program, and the program is executed by a processor to perform the method in the second aspect.

A twelfth aspect of the embodiments of this application provides a program product, for example, a computer readable storage medium, including the program in the eleventh aspect.

According to the data communication method, the terminal, and the base station provided in this application, the terminal receives the common information based on the first PRB index, and transmits and/or receives the terminal-specific information based on the second PRB index. The first PRB index is determined based on the first bandwidth and/or the first location in frequency domain, and the second PRB index is determined based on the second bandwidth and/or the second location in frequency domain. The terminal may determine the first PRB index based on the first bandwidth and/or the first location in frequency domain, and determine the second PRB index based on the second bandwidth and/or the second location in frequency domain, and the terminal may separately receive the common information, and transmit and/or receive the terminal-specific information based on different PRB indexes. Therefore, the terminal can determine a PRB index, and transmit and/or receive a reference signal and data channel information to the base station based on the determined PRB index.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
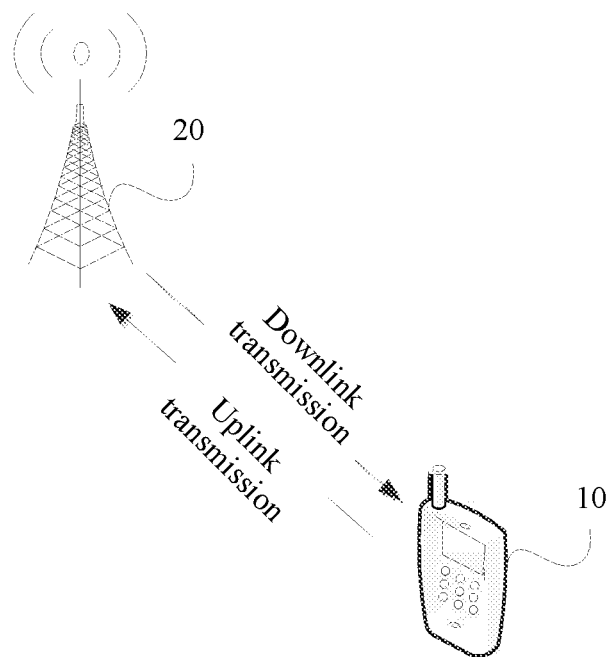
FIG. 1 is a schematic structural diagram of an NR system.

The following describes some terms in this application to facilitate understanding of a person skilled in the art.

(1) A terminal is also referred to as user equipment (UE), a mobile station (MS), a mobile terminal (MT), or the like, and is a device that provides a user with voice and/or data connectivity, for example, a handheld device or an in-vehicle device with a wireless connection function. Currently, for example, some terminals are a mobile phone, a tablet computer, a notebook computer, a palmtop computer, a mobile internet device (MID), a wearable terminal, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, and a wireless terminal in a smart home.

(2) A radio access network (RAN) is a part of a network in which a terminal accesses a wireless network. A RAN node (or device) is a node (or device) in the radio access network, and may also be referred to as a base station or a network device. Currently, for example, some RAN nodes are a gNB, a transmission reception point (TRP), an evolved NodeB (eNB), a radio network controller (RNC), a NodeB (NodeB, NB), a base station controller (BSC), a base transceiver station (BTS), a home base station (for example, a home evolved NodeB or a home NodeB, HNB), a baseband unit (BBU), and a WiFi access point (AP). In addition, in a network structure, the RAN may include a centralized unit (CU) node and a distributed unit (DU) node.

(3) A maximum carrier bandwidth is a maximum quantity of PRBs that are included in a carrier, and is determined based on a subcarrier spacing. For example, a maximum carrier bandwidth corresponding to a band below 6 GHz is 100 MHz, and when the subcarrier spacing is 15 kHz, the maximum carrier bandwidth includes 550 PRBs; when the subcarrier spacing is 30 kHz, the maximum carrier bandwidth includes 275 PRBs; or when the subcarrier spacing is 60 kHz, the maximum carrier bandwidth includes 137 PRBs. A maximum carrier bandwidth corresponding to a band above 6 GHz is 400 MHz, and when the subcarrier spacing is 60 kHz, the maximum carrier bandwidth includes 550 PRBs; or when the subcarrier spacing is 120 kHz, the maximum carrier bandwidth includes 275 PRBs. In particular, the maximum carrier bandwidth may be a maximum downlink carrier bandwidth. The maximum carrier bandwidth may also be a maximum uplink carrier bandwidth.

(4) A "carrier bandwidth part" is a part of a channel bandwidth, may also be referred to as a "bandwidth part", an "operating bandwidth" or a communication bandwidth, a mini BP, a BP unit, a BP sub-band, or the like, and may be abbreviated as BP or BWP. A name and an abbreviation of the carrier bandwidth part are not specifically limited in the embodiments of this application. The BWP is a bandwidth determined in a first step of two-level resource allocation during data communication, and may be a segment of consecutive or inconsecutive resources in frequency domain. For example, a carrier bandwidth part includes K consecutive or inconsecutive subcarriers, wherein K>0; or a carrier bandwidth part is a frequency domain resource on which N non-overlapping consecutive or inconsecutive resource blocks are located, wherein N>0; or a carrier bandwidth part is a frequency domain resource on which M non-overlapping consecutive or inconsecutive resource block groups (RBG) are located, wherein M>0 and one RBG includes P consecutive RBs, wherein P>0. A carrier bandwidth part is related to a specific system parameter set (numerology), and the system parameter set includes at least one of a subcarrier spacing and a cyclic prefix (CP).

(5) A system parameter set (numerology) is a series of physical layer parameters in an air interface. In specific implementation, optionally one BWP may be corresponding to one numerology. The numerology includes a subcarrier spacing, a time unit type, a cyclic prefix (CP) type, or the like. The subcarrier spacing is used as an example. If a terminal device supports a subcarrier spacing 15 kHz and a subcarrier spacing 30 kHz, a base station may allocate a BWP with a subcarrier spacing 15 kHz and a BWP with a subcarrier spacing 30 kHz to the terminal device. The terminal device may be handed over to different BWPs based on different scenarios and service requirements, or may simultaneously transmit and/or receive data on two or more BWPs. When the terminal device supports a plurality of BWPs, the numerology that each BWP is corresponding to is same or different from each other.

(6) A unit in this application is a functional unit or a logical unit. The unit may be in a form of software and a function of the unit is implemented by a processor executing program code, or the unit may be in a form of hardware.

(7) The term "a plurality of" means two or more, and is similar to another quantifier. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects. A range described by using "above", "below", or the like includes boundary points.

A person skilled in the art may understand that a data communication method provided in the embodiments of this application may be applied to a 5th generation (5G) network and a subsequent evolved communications system, and may also be applied to another wireless communications network, such as a Universal Mobile Telecommunications System (UMTS) network, or a backward-compatible LTE network. FIG. 1 is a schematic structural diagram of an NR system. As shown in FIG. 1, the system includes a terminal 10 and a RAN 20. The terminal 10 may be, for example, UE, and the RAN 20 may be a base station. In the system architecture in FIG. 1, protocol layers of an eNB in a Long Term Evolution (LTE) system are separated, functions of some protocol layers are configured on a CU node for central control, functions of some or all of remaining protocol layers are distributed in a DU node, and the CU node controls the DU node in a centralized manner.

Based on the system architecture in FIG. 1, in NR, a synchronization signal is not necessarily located in the middle of a downlink carrier, the terminal cannot learn of a central location of the carrier, and one carrier may include a plurality of synchronization signals in frequency domain. Therefore, the terminal cannot determine a PRB index, and therefore cannot transmit and/or receive a reference signal or data channel information to the base station.

In view of these cases, the embodiments of this application provide a data communication method. The terminal receives, based on a first PRB index, common information sent by the base station, and transmits and/or receives terminal-specific information based on a second PRB index. The first PRB index is determined based on a first bandwidth and/or a first location in frequency domain, and the second PRB index is determined based on a second bandwidth and/or a second location in frequency domain. The terminal may determine the first PRB index based on the first bandwidth and/or the first location in frequency domain, and determine the second PRB index based on the second bandwidth and/or the second location in frequency domain, and the terminal may separately receive the common information and transmit and/or receive the terminal-specific information based on different PRB indexes. Therefore, the terminal can determine a PRB index, and transmit and/or receive a reference signal and data channel information to the base station based on the determined PRB index.

Figure 2:
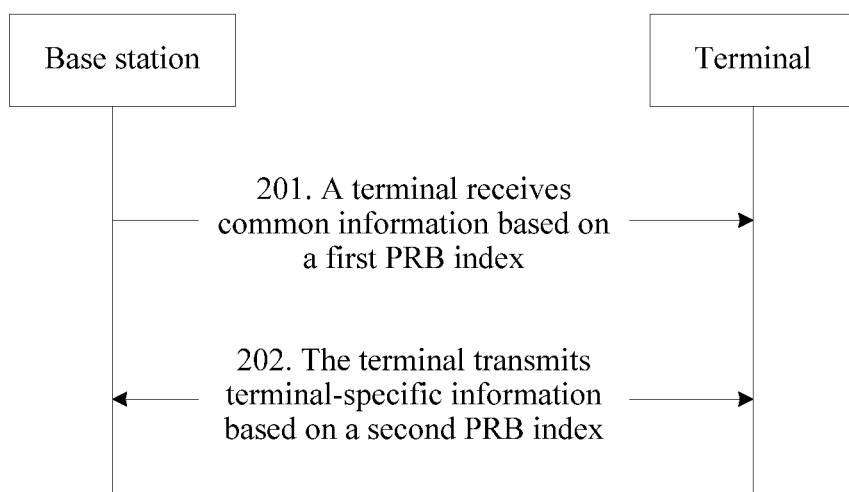
FIG. 2 is a signaling flowchart of Embodiment 1 of a data communication method according to this application.

FIG. 2 is a signaling flowchart of Embodiment 1 of a data communication method according to this application. On the basis of the system architecture shown in FIG. 1, as shown in FIG. 2, the method in this embodiment may include the following steps.

Step 201: A terminal receives common information based on a first PRB index, where the first PRB index is determined based on a first bandwidth and/or a first location in frequency domain.

Optionally, different subcarrier spacings are corresponding to respective first PRB indexes.

In particular, the first PRB index is a PRB index used before a connection is established between the terminal and a base station, or the first PRB index is a PRB index used before the terminal receives a SIB.

In this embodiment, the terminal may receive, based on the first PRB index, common information sent by the base station. The first PRB index may be determined based on only the first bandwidth, or may be determined based on only the first location, or may be determined based on the first bandwidth and the first location.

The first bandwidth may be determined based on a maximum downlink carrier bandwidth, or may be not greater than a minimum terminal bandwidth capability, or may be determined based on a minimum terminal bandwidth capability. Optionally, the first bandwidth is a positive integer multiple of the maximum downlink carrier bandwidth. The maximum downlink carrier bandwidth is a maximum quantity of PRBs that are included in a downlink carrier, or a quantity of PRBs that can be simultaneously sent by the base station. Optionally, the maximum downlink carrier bandwidth is determined based on a subcarrier spacing corresponding to the first PRB index. The minimum terminal bandwidth capability is a minimum value of maximum bandwidth capabilities of all terminals, and a maximum bandwidth capability of a terminal is a maximum bandwidth that can be supported by the terminal, to be specific, a maximum quantity of PRB blocks that can be simultaneously transmitted and/or received by the terminal.

The first location is a frequency domain location of a synchronization signal block or is determined based on first information. The frequency domain location of the synchronization signal block is a location of a lowest PRB (a central PRB or a highest PRB) of the synchronization signal block, or a location of one of subcarrier 0, subcarrier 5, subcarrier 6, and subcarrier 11 of the PRB, or a location at a shift of ½ subcarrier spacing from the one of subcarrier 0, subcarrier 5, subcarrier 6, and subcarrier 11 of the PRB. In particular, when the synchronization signal block includes K=2K' PRBs, the central PRB is a $(K'-1)^{th}$ PRB or a $K^{th}$ PRB; or when the synchronization signal block includes K=2K'+1 PRBs, the central PRB is a $K'^{th}$ PRB. In addition, the first location may be alternatively determined based on the first information. The first location may be a location of a PRB, or a location of one of subcarrier 0, subcarrier 5, subcarrier 6, and subcarrier 11 of a PRB, or a location at a shift of ½ subcarrier spacing from one of subcarrier 0, subcarrier 5, subcarrier 6, and subcarrier 11 of a PRB. In actual application, the base station may add the first information for configuring the first location to some broadcast signaling and send the broadcast signaling to the terminal. In particular, the first information may be indicated by using a master information block. Optionally, the first information indicates a first offset between the first location and a frequency domain reference location, and the frequency domain reference location may be the frequency domain location of the synchronization signal block.

The following describes in detail a manner of determining the first PRB index.

A first possible embodiment is provided below.

Figure 3A:
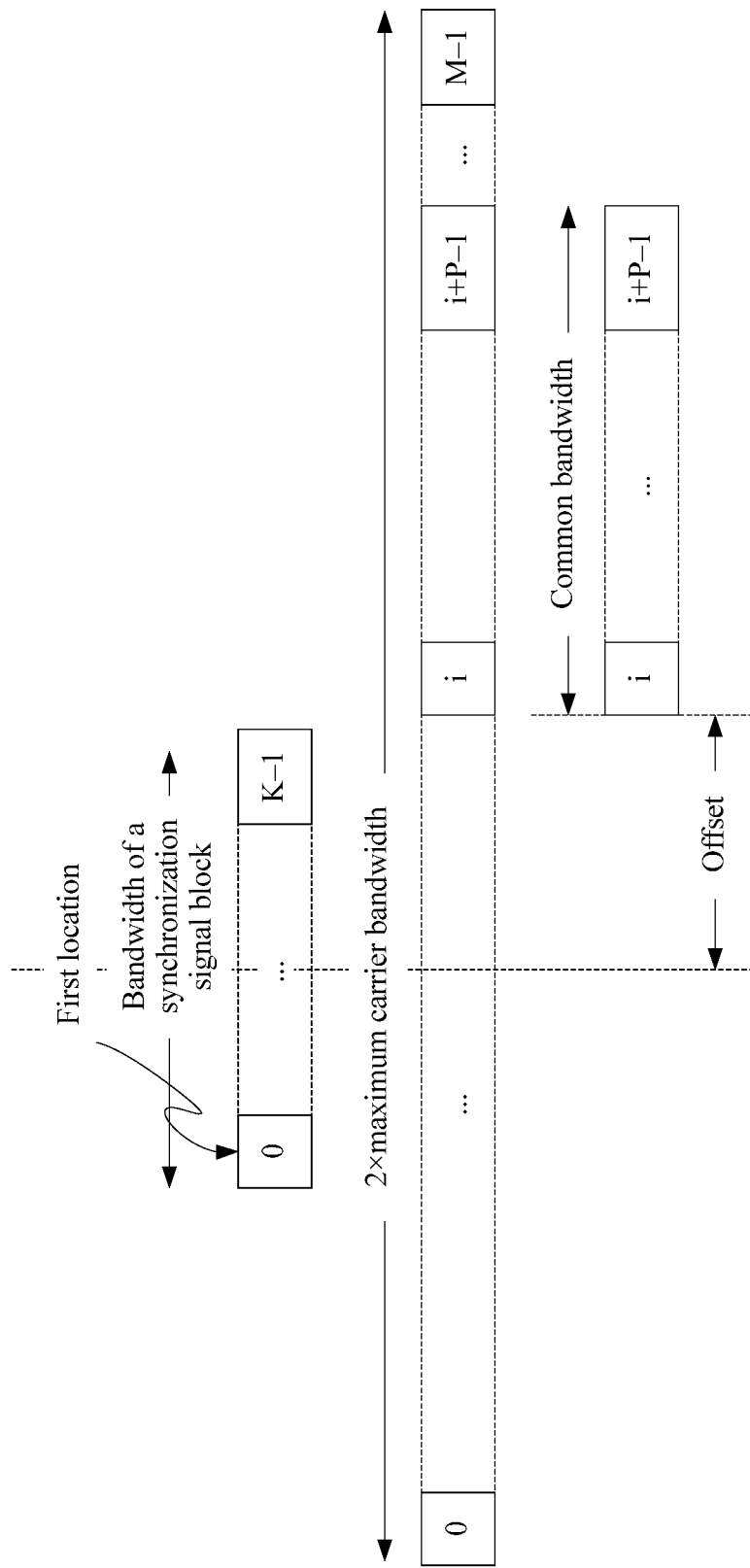
FIG. 3a is a schematic diagram of a manner of determining a first PRB index.

Optionally, FIG. 3a is a schematic diagram of the manner of determining the first PRB index. As shown in FIG. 3a, the first PRB index {0, 1, . . . , M−1} is a common downlink PRB index. A PRB corresponding to an index 0 may be determined based on the first location in frequency domain and the first bandwidth, and on the basis of this, a PRB corresponding to a maximum index may be determined based on the first bandwidth. The first location is the frequency domain location of the synchronization signal block, and the first bandwidth is determined based on the maximum downlink carrier bandwidth. Optionally, the first bandwidth is a positive integer multiple of the maximum downlink carrier bandwidth. For example, the first bandwidth is two times of the maximum downlink carrier bandwidth.

Figure 3B:
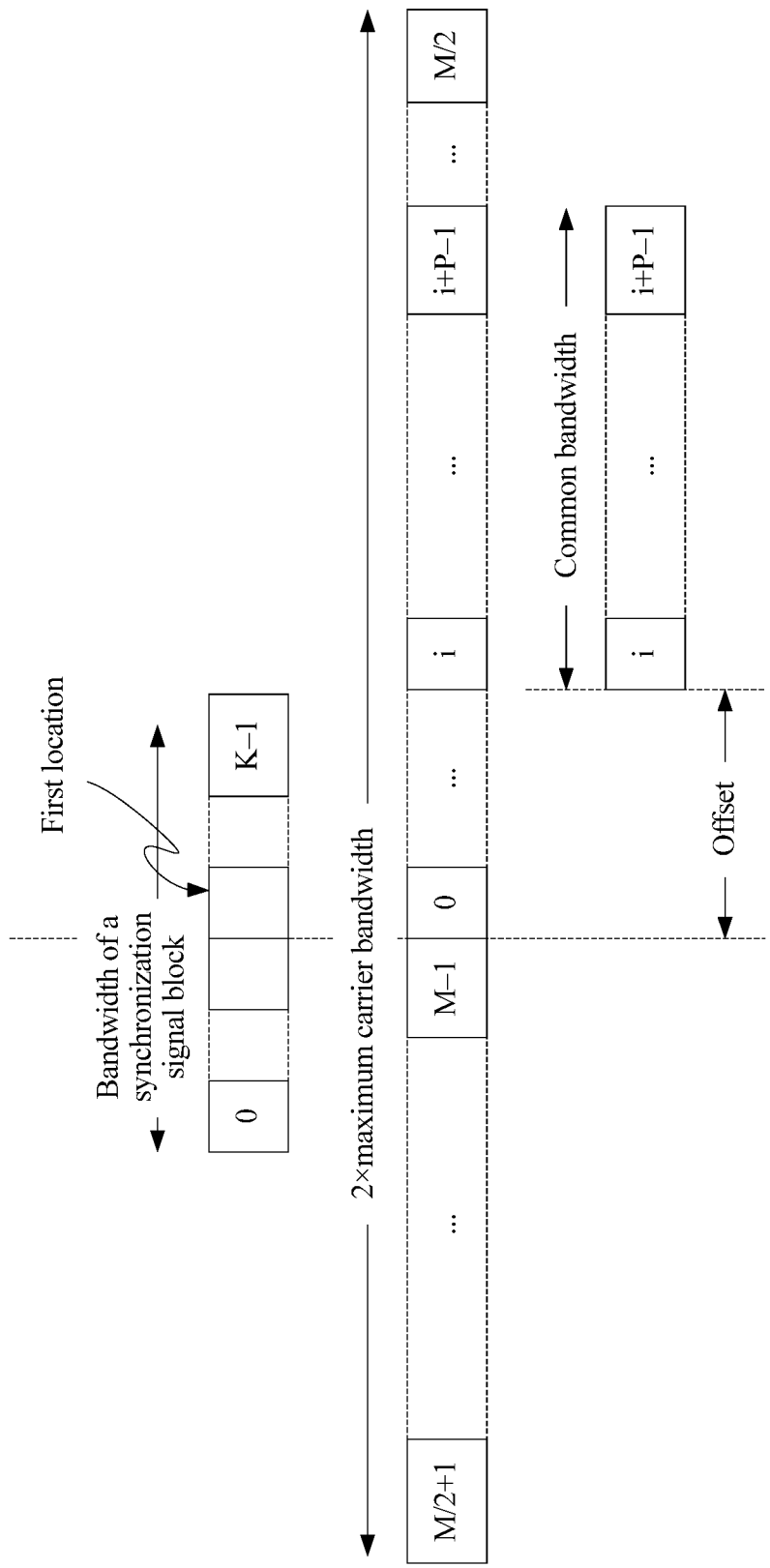
FIG. 3b is another schematic diagram of a manner of determining a first PRB index.

Optionally, FIG. 3b is another schematic diagram of the manner of determining the first PRB index. As shown in FIG. 3b, the first PRB index {0, 1, . . . , M−1} is a common downlink PRB index. A PRB corresponding to an index 0 may be determined based on the first location in frequency domain, and on the basis of this, a PRB corresponding to a maximum index may be determined based on the first bandwidth. The first location is the frequency domain location of the synchronization signal block, and the first bandwidth is determined based on the maximum downlink carrier bandwidth. Optionally, the first bandwidth is a positive integer multiple of the maximum downlink carrier bandwidth. For example, the first bandwidth is two times of the maximum downlink carrier bandwidth.

It should be noted that numbering of PRBs in the first PRB index shown in FIG. 3a and FIG. 3b is merely an example. Certainly, the PRBs in the first PRB index may be numbered in another manner, for example, the PRBs are numbered from right to left, or the PRBs are numbered from middle to right and then are numbered from the left. When the PRBs in the first PRB index are numbered in another manner, the manner of determining the first PRB index is similar to the determining manners shown in FIG. 3a and FIG. 3b, and details are not described herein again.

Optionally, the terminal may determine, based on the first PRB index, a sub-band resource on which a SIB is located and/or a PDCCH resource for scheduling the SIB, that is, a common bandwidth resource shown in FIG. 3a and FIG. 3b. The terminal performs blind detection on the synchronization signal block based on a synchronization signal raster, and the synchronization signal block includes a primary synchronization signal, a secondary synchronization signal, and a physical broadcast channel (PBCH). The terminal determines, based on a master information block (MIB) carried on the PBCH, the sub-band resource on which the SIB is located. The sub-band resource includes a frequency domain location and a bandwidth of the sub-band or includes only a frequency domain location of the sub-band. A definition of the frequency domain location of the sub-band is the same as the definition of the frequency domain location of the synchronization signal block, and details are not described herein again. Alternatively, the terminal determines, based on an MIB carried on the PBCH, the physical downlink control channel (PDCCH) resource for scheduling the SIB. The PDCCH resource includes a frequency domain location and a bandwidth of the PDCCH resource or includes only a frequency domain location of the PDCCH resource. A definition of the frequency domain location of the PDCCH resource is the same as the definition of the frequency domain location of the synchronization signal block, and details are not described herein again. Then the terminal determines, based on the PDCCH resource or downlink control information (DCI) carried on the PDCCH, the sub-band resource on which the SIB is located.

To be specific, it is specified that the first PRB index is within a first virtual bandwidth, and the first virtual bandwidth is determined based on the frequency domain location of the synchronization signal block and a maximum carrier bandwidth. Optionally, the first virtual bandwidth is aligned with a location of a central PRB of the synchronization signal block or a location of one of subcarrier 0, subcarrier 5, subcarrier 6, and subcarrier 11 of the PRB or a location at a shift of ½ subcarrier spacing from the subcarrier. The first virtual bandwidth may also be referred to as a first maximum virtual bandwidth, a first nominal bandwidth, or a first maximum nominal bandwidth, and this is not limited in this application.

Optionally, based on the first PRB index, the terminal may further receive, on the sub-band on which the SIB is located, at least one of a DMRS for demodulating a common downlink control channel, the common downlink control channel, a DMRS for demodulating a common downlink data channel, the common downlink data channel, a DMRS for demodulating a terminal-specific control channel, the terminal-specific control channel, a DMRS for demodulating a terminal-specific data channel, and the terminal-specific data channel. A data channel is a shared channel, the common downlink data channel includes at least a downlink data channel scheduled by using common downlink control information, the common downlink data channel includes at least a common downlink data channel corresponding to the SIB, and a terminal-specific downlink data channel includes at least a downlink data channel scheduled by using terminal downlink control information. Optionally, the terminal may further receive, on the PDCCH resource based on the first PRB index, common downlink control information including at least common downlink control information for scheduling a common downlink data channel corresponding to the SIB and/or terminal-specific downlink control information for scheduling a terminal-specific downlink data channel.

In particular, the base station may determine a sequence of a downlink reference signal based on the first PRB index, the base station maps a part or all of the sequence of the downlink reference signal to at least one resource element (RE), and the base station sends the downlink reference signal on the at least one RE. The downlink reference signal may be a DMRS, and the DMRS may be used to demodulate at least one of the following channels: the common downlink data channel including at least the common downlink data channel corresponding to the SIB, a common downlink control channel including at least a common downlink control channel for scheduling the common downlink data channel corresponding to the SIB, a terminal-specific downlink control channel, and the terminal-specific downlink data channel.

In this embodiment of this application, that the base station determines a DMRS sequence, and maps a part or all of the sequence to an RE is used as an example for description. A manner of determining a sequence of another reference signal is similar to a manner of determining the DMRS sequence, and details are not described herein. Optionally, the another reference signal includes a channel state information-reference signal (CSI-RS) or a phase-tracking reference signal (PT-RS).

In a possible implementation, the DMRS sequence is defined by using the first PRB index. Specifically, the DMRS sequence may be generated according to a formula (1):

$$r(m) = \frac{1}{\sqrt{2}}(1 - 2 \cdot c(2m)) + j\frac{1}{\sqrt{2}}(1 - 2 \cdot c(2m+1)), \quad (1)$$
$$m = 0, 1, \ldots, A \cdot M - 1$$

In the formula, r(m) is the DMRS sequence, c(m) is a pseudo sequence, M is determined based on the maximum downlink carrier bandwidth, and A is a positive integer and represents a quantity of REs that are of a first frequency domain unit in frequency domain and a first time unit in time domain and that are used for transmitting the DMRS. The first frequency domain unit includes 12K subcarriers, K is a positive integer, and the first time unit may be a symbol, a symbol group, a timeslot, a timeslot group, a subframe, or the like. Specific content of the first time unit is not limited in this embodiment. Optionally, when it is specified that a sequence of a reference signal is within a subframe, A may be determined based on a system parameter set corresponding to a sub-band on which the reference signal is located, and the system parameter set includes a subcarrier spacing and/or a CP type. Optionally, when the DMRS is used to demodulate at least a PDCCH for scheduling a downlink data channel corresponding to the SIB and/or the terminal-specific downlink control channel, A is determined based on a quantity of symbols included in the PDCCH resource in time domain.

As shown in FIG. 3a and FIG. 3b, when the generated DMRS sequence is mapped to an RE, a number that is of each PRB on the sub-band and that is corresponding to the first PRB index may be determined based on the frequency domain location of the sub-band, so as to determine a transmitted and/or received reference signal. Specifically, the DMRS sequence may be mapped according to a formula (2):

$$a_{k,l}^{(p)} = F_1(r(B \cdot n_{CPRB})) \quad (2)$$

In the formula, $F_1(\bullet)$ is a predefined function, k is an index of a subcarrier in frequency domain, l is an index of a symbol in time domain, p is an antenna port number, $a_{k,l}^{(p)}$ is a complex-valued modulation symbol corresponding to the antenna port number p on an RE (k,l), $n_{CPRB}$ is a number that is of a PRB on the sub-band and that is corresponding to the first PRB index, and B is a positive integer and represents a quantity of REs that are of a second frequency domain unit in frequency domain and a second time unit in time domain and that are used for transmitting the DMRS. The second frequency domain unit includes 12L subcarriers, L is a positive integer, and the second time unit may be a symbol, a symbol group, a timeslot, a timeslot group, a subcarrier, or the like. Specific content of the second time unit is not limited in this embodiment. Optionally, when it is specified that a sequence of a reference signal is within a subframe, B is determined based on a system parameter set corresponding to a sub-band on which the DMRS is located, and the system parameter set includes a subcarrier spacing and/or a CP type.

Similarly, the terminal may determine, based on the frequency domain location of the PDCCH resource, a number that is of each PRB on the PDCCH resource and that is corresponding to the first PRB index, so as to determine a transmitted and/or received reference signal. Specifically, the DMRS sequence may be mapped according to a formula (3):

$$a_{k,l}^{(p)} = F_2(r(B \cdot n_{CCE})) \quad (3)$$

In the formula, $F_2(\bullet)$ is a predefined function, $n_{CCE}$ is a number of a CCE on the PDCCH resource, and the number is determined based on a symbol index corresponding to the CCE in time domain and/or a PRB index corresponding to the CCE in frequency domain. Optionally, B is determined based on a quantity of symbols included in the PDCCH resource in time domain.

In this embodiment, without learning of a carrier bandwidth or a location of the synchronization signal block on a carrier, the terminal may correctly receive, based on the first PRB index, at least one of the following channels: the common downlink data channel including at least the common downlink data channel corresponding to the SIB, the common downlink control channel including at least the common downlink control channel for scheduling the common downlink data channel corresponding to the SIB, the terminal-specific downlink control channel, and the terminal-specific downlink data channel.

A second possible embodiment is provided below.

Figure 4A:
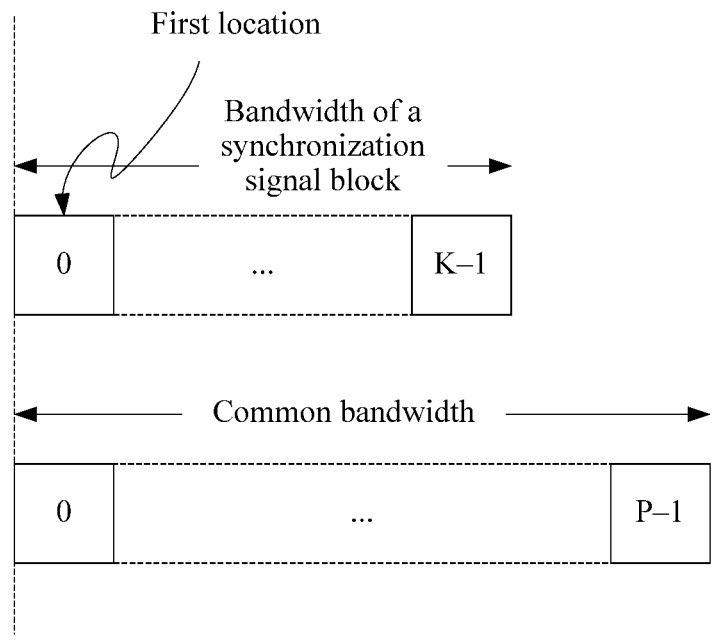
FIG. 4a is still another schematic diagram of a manner of determining a first PRB index.

Optionally, FIG. 4a is still another schematic diagram of the manner of determining the first PRB index. As shown in FIG. 4a, the first PRB index {0, 1, . . . , P−1} is a common downlink PRB index. A PRB corresponding to an index 0 may be determined based on the first location in frequency domain, and on the basis of this, a PRB corresponding to a maximum index may be determined based on the first bandwidth. The first location is the frequency domain location of the synchronization signal block, and the first bandwidth is not greater than the minimum terminal bandwidth capability.

Figure 4B:
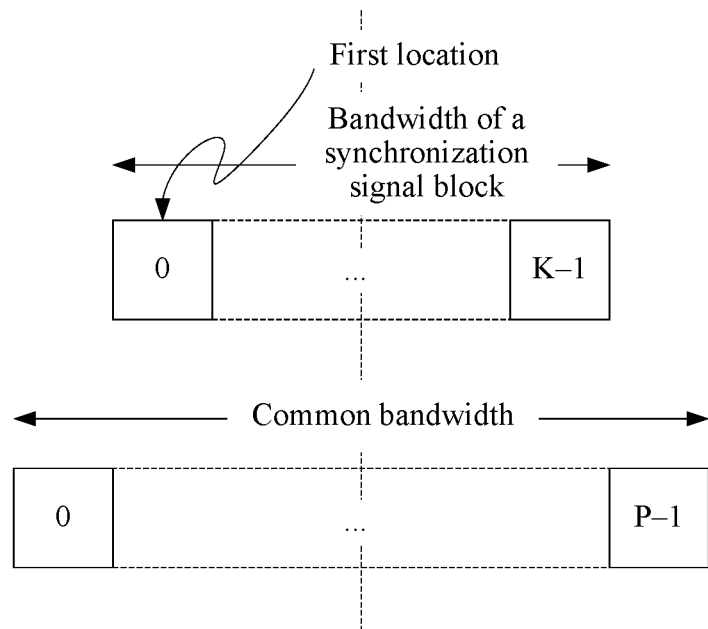
FIG. 4b is still another schematic diagram of a manner of determining a first PRB index.

Optionally, FIG. 4b is still another schematic diagram of the manner of determining the first PRB index. As shown in FIG. 4b, the first PRB index {0, 1, . . . , P−1} is a common downlink PRB index. A PRB corresponding to an index 0 may be determined based on the first location in frequency domain and the first bandwidth, and on the basis of this, a PRB corresponding to a maximum index may be determined based on the first bandwidth. The first location is the frequency domain location of the synchronization signal block, and the first bandwidth is not greater than the minimum terminal bandwidth capability.

Figure 4C:
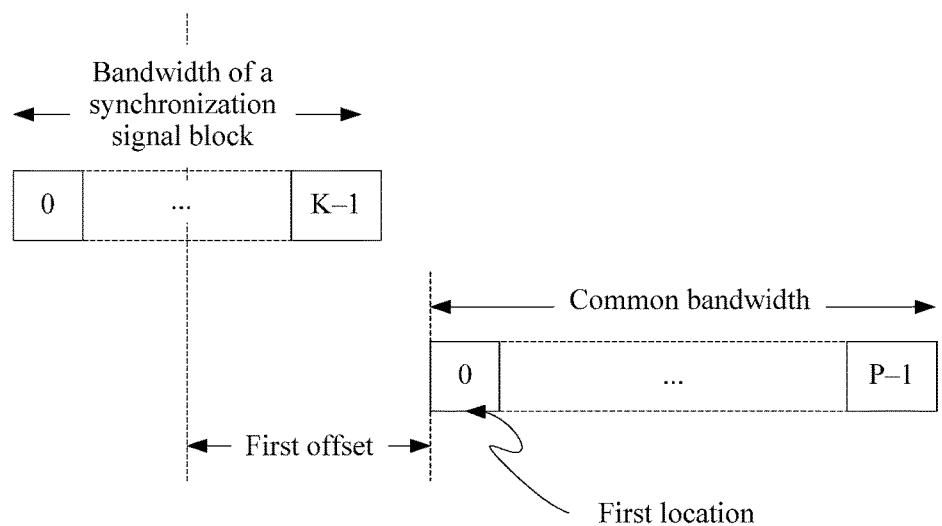
FIG. 4c is still another schematic diagram of a manner of determining a first PRB index.

Optionally, FIG. 4c is still another schematic diagram of the manner of determining the first PRB index. As shown in FIG. 4c, the first PRB index {0, 1, . . . , P−1} is a common downlink PRB index. A PRB corresponding to an index 0 may be determined based on the first location in frequency domain, and on the basis of this, a PRB corresponding to a maximum index may be determined based on the first bandwidth. The first location is determined based on the first information, and the first bandwidth is not greater than the minimum terminal bandwidth capability.

Figure 4D:
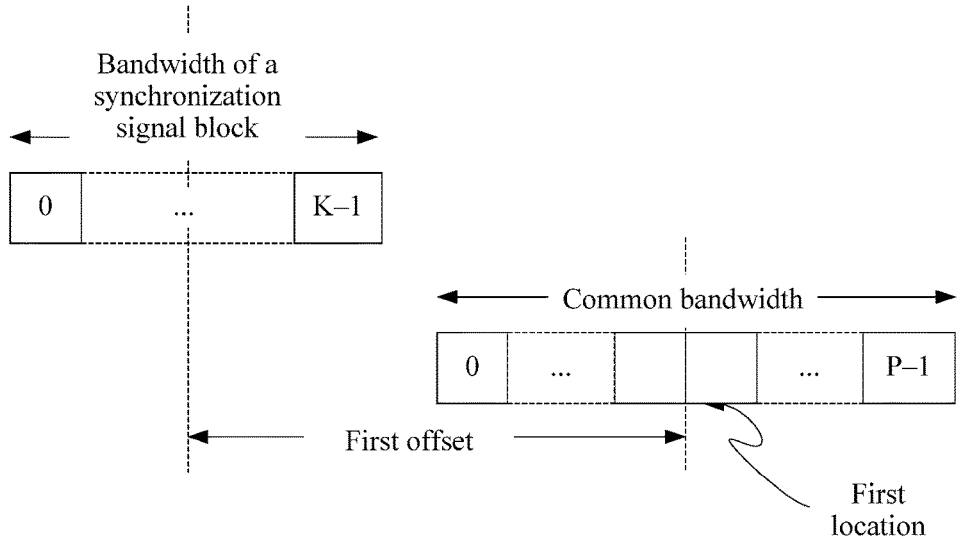
FIG. 4d is still another diagram of a manner of determining a first PRB index.

Optionally, FIG. 4d is still another schematic diagram of the manner of determining the first PRB index. As shown in FIG. 4d, the first PRB index {0, 1, . . . , P−1} is a common downlink PRB index. A PRB corresponding to an index 0 may be determined based on the first location in frequency domain and the first bandwidth, and on the basis of this, a PRB corresponding to a maximum index may be determined based on the first bandwidth. The first location is determined based on the first information, and the first bandwidth is not greater than the minimum terminal bandwidth capability.

It should be noted that numbering of PRBs in the first PRB index shown in FIG. 4a to FIG. 4d is merely an example. Certainly, the PRBs in the first PRB index may be numbered in another manner, for example, the PRBs are numbered from right to left, or the PRBs are numbered from the middle. When the PRBs in the first PRB index are numbered in another manner, the manner of determining the first PRB index is similar to the determining manners shown in FIG. 4a to FIG. 4d, and details are not described herein again.

Optionally, the terminal may determine, based on the first PRB index, a sub-band resource on which a SIB is located and/or a PDCCH resource for scheduling the SIB, that is, a common bandwidth resource shown in FIG. 4a to FIG. 4d. The terminal performs blind detection on the synchronization signal block based on a synchronization signal raster, and the synchronization signal block includes a primary synchronization signal, a secondary synchronization signal, and a PBCH. The terminal determines, based on an MIB carried on the PBCH, the sub-band resource on which the SIB is located. The sub-band resource includes a frequency domain location and a bandwidth of the sub-band or includes only a frequency domain location of the sub-band. A definition of the frequency domain location of the sub-band is the same as the definition of the frequency domain location of the synchronization signal block, and details are not described herein again. Alternatively, the terminal determines, based on an MIB carried on the PBCH, the PDCCH resource for scheduling the SIB. The PDCCH resource includes a frequency domain location and a bandwidth of the PDCCH resource or includes only a frequency domain location of the PDCCH resource. A definition of the frequency domain location of the PDCCH resource is the same as the definition of the frequency domain location of the synchronization signal block, and details are not described herein again. Then the terminal determines, based on the PDCCH resource or DCI carried on the PDCCH, the sub-band resource on which the SIB is located.

Optionally, based on the first PRB index, the terminal receives, on the sub-band on which the SIB is located, at least one of a DMRS for demodulating a common downlink control channel, the common downlink control channel, a DMRS for demodulating a common downlink data channel, the common downlink data channel, a DMRS for demodulating a terminal-specific control channel, the terminal-specific control channel, a DMRS for demodulating a terminal-specific data channel, and the terminal-specific data channel. A data channel is a shared channel, the common downlink data channel includes at least a downlink data channel scheduled by using common downlink control information, the common downlink data channel includes at least a common downlink data channel corresponding to the SIB, and a terminal-specific downlink data channel includes at least a downlink data channel scheduled by using terminal downlink control information. Optionally, the terminal may further receive, on the PDCCH resource based on the first PRB index, common downlink control information including at least common downlink control information for scheduling a common downlink data channel corresponding to the SIB and/or terminal-specific downlink control information for scheduling a terminal-specific downlink data channel. Because the terminal does not report a bandwidth capability before completing access, to ensure that all terminals can correctly receive a SIB and/or a PDCCH, the bandwidth of the sub-band and/or the bandwidth of the PDCCH resource do/does not exceed the minimum terminal bandwidth capability. Therefore, the first bandwidth is not greater than the minimum terminal bandwidth capability.

To be specific, the first PRB index is within a common bandwidth, and the common bandwidth is determined based on the frequency domain location of the synchronization signal block or a frequency domain location indicated by the base station, and a predefined bandwidth or a bandwidth indicated by the base station.

In particular, the base station may determine a sequence of a downlink reference signal based on the first PRB index, the base station maps a part or all of the sequence of the downlink reference signal to at least one RE, and the base station sends the downlink reference signal on the at least one RE. The downlink reference signal may be a DMRS, and the DMRS may be used to demodulate at least one of the following channels: the common downlink data channel including at least the common downlink data channel corresponding to the SIB, a common downlink control channel including at least a common downlink control channel for scheduling the common downlink data channel corresponding to the SIB, a terminal-specific downlink control channel, and the terminal-specific downlink data channel.

In this embodiment of this application, that the base station determines a DMRS sequence, and maps a part or all of the sequence to an RE is used as an example for description. A manner of determining a sequence of another reference signal is similar to a manner of determining the DMRS sequence, and details are not described herein. Optionally, the another reference signal includes a CSI-RS and/or a PT-RS.

In a possible implementation, the DMRS sequence is defined by using the first PRB index. Specifically, the DMRS sequence may be generated according to a formula (4):

$$r(m) = \frac{1}{\sqrt{2}}(1 - 2 \cdot c(2m)) + j\frac{1}{\sqrt{2}}(1 - 2 \cdot c(2m+1)), \quad (4)$$

$$m = 0, 1, \ldots, A \cdot P - 1$$

In the formula, r(m) is the DMRS sequence, c(m) is a pseudo sequence, P is a quantity of RBs included in the sub-band or a quantity of RBs corresponding to the PDCCH resource in frequency domain, P is not greater than a minimum value $N_{RB}^{min,DL}$ of maximum downlink bandwidth capabilities of all terminals and may be predefined, and A represents a quantity of REs that are of a first frequency domain unit in frequency domain and a first time unit in time domain and that are used for transmitting the DMRS. The first frequency domain unit includes 12K subcarriers, K is a positive integer, and the first time unit may be a symbol, a symbol group, a timeslot, a timeslot group, a subframe, or the like. Specific content of the first time unit is not limited in this embodiment. Optionally, when it is specified that a sequence of a reference signal is within a subframe, A may be determined based on a system parameter set corresponding to a sub-band on which the reference signal is located, and the system parameter set includes a subcarrier spacing and/or a CP type. Optionally, when the DMRS is used to demodulate the common downlink control channel including at least the common downlink control channel for scheduling the common downlink data channel corresponding to the SIB and/or the terminal-specific downlink control channel, A is determined based on a quantity of symbols included in the PDCCH resource in time domain.

After the DMRS sequence is generated, the DMRS sequence may be mapped to an RE according to a formula (5):

$$a_{k,l}^{(p)} = G_1(r(m')), m'=0,1,\ldots,B \cdot P-1 \quad (5)$$

In the formula, $G_1(\cdot)$ is a predefined function, k is an index of a subcarrier in frequency domain, l is an index of a symbol in time domain, p is an antenna port number, $a_{k,l}^{(p)}$ is a complex-valued modulation symbol corresponding to the antenna port number p on an RE (k,l), and B represents a quantity of Res that are of a second frequency domain unit in frequency domain and a second time unit in time domain and that are used for transmitting the DMRS. The second frequency domain unit includes 12L subcarriers, L is a positive integer, and the second time unit may be a symbol, a symbol group, a timeslot, a timeslot group, a subcarrier, or the like. Specific content of the second time unit is not limited in this embodiment. Optionally, when it is specified that a sequence of a reference signal is within a subframe, B is determined based on a system parameter set corresponding to a sub-band on which the DMRS is located, and the system parameter set includes a subcarrier spacing and/or a CP type. Optionally, B is determined based on a quantity of symbols included in the PDCCH resource in time domain.

In this embodiment, without learning of a carrier bandwidth or a location of the synchronization signal block on a carrier, the terminal may correctly receive, based on the first PRB index, at least one of the following channels: the common downlink data channel including at least the common downlink data channel corresponding to the SIB, the common downlink control channel including at least the common downlink control channel for scheduling the common downlink data channel corresponding to the SIB, the terminal-specific downlink control channel, and the terminal-specific downlink data channel. In addition, the common downlink data channel including at least the common downlink data channel corresponding to the SIB and/or the terminal-specific downlink control channel are/is confined in a common bandwidth that is not greater than the minimum terminal bandwidth capability, so as to reduce a size of DCI and improve communication robustness.

A third possible embodiment is provided below.

Figure 5A:
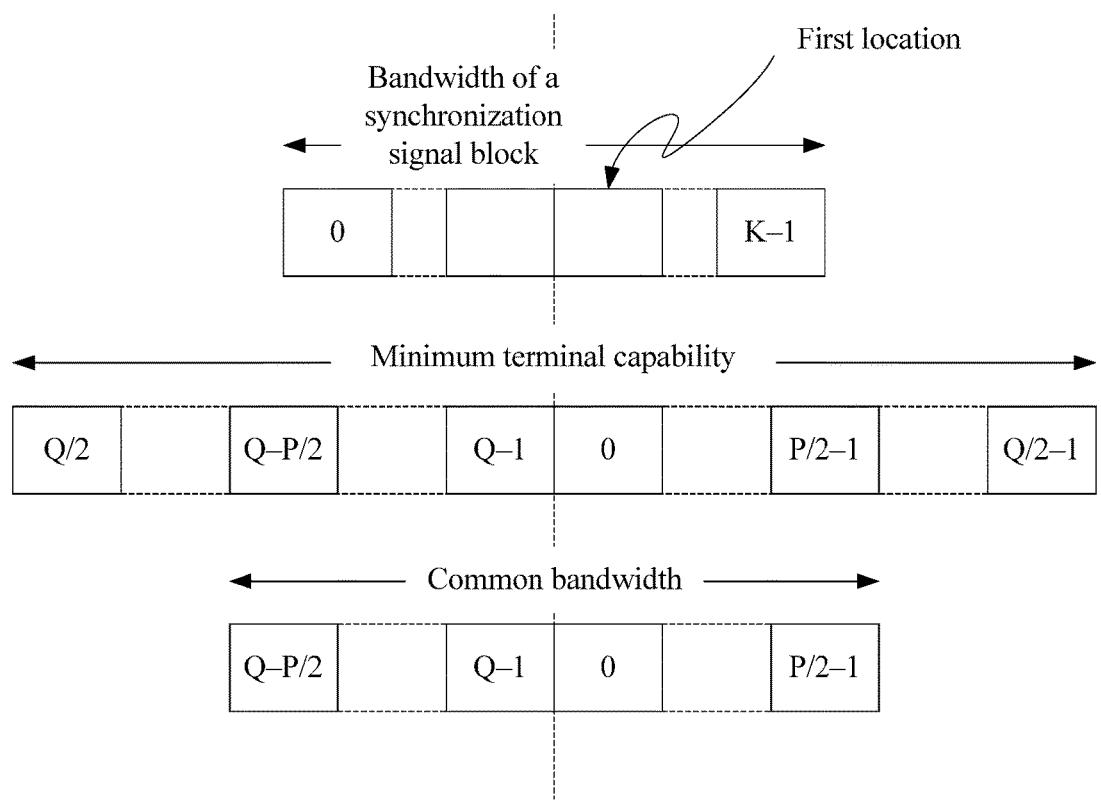
FIG. 5a is still another schematic diagram of a manner of determining a first PRB index.

Optionally, FIG. 5a is still another schematic diagram of the manner of determining the first PRB index. As shown in FIG. 5a, the first PRB index $\{0, 1, \ldots, Q-1\}$ is a common downlink PRB index. A PRB corresponding to an index 0 may be determined based on the first location in frequency domain, and on the basis of this, a PRB corresponding to a maximum index may be determined based on the first bandwidth. The first location is the frequency domain location of the synchronization signal block, and the first bandwidth is determined based on the minimum terminal bandwidth capability. Optionally, the first bandwidth is the minimum terminal bandwidth capability.

Figure 5B:
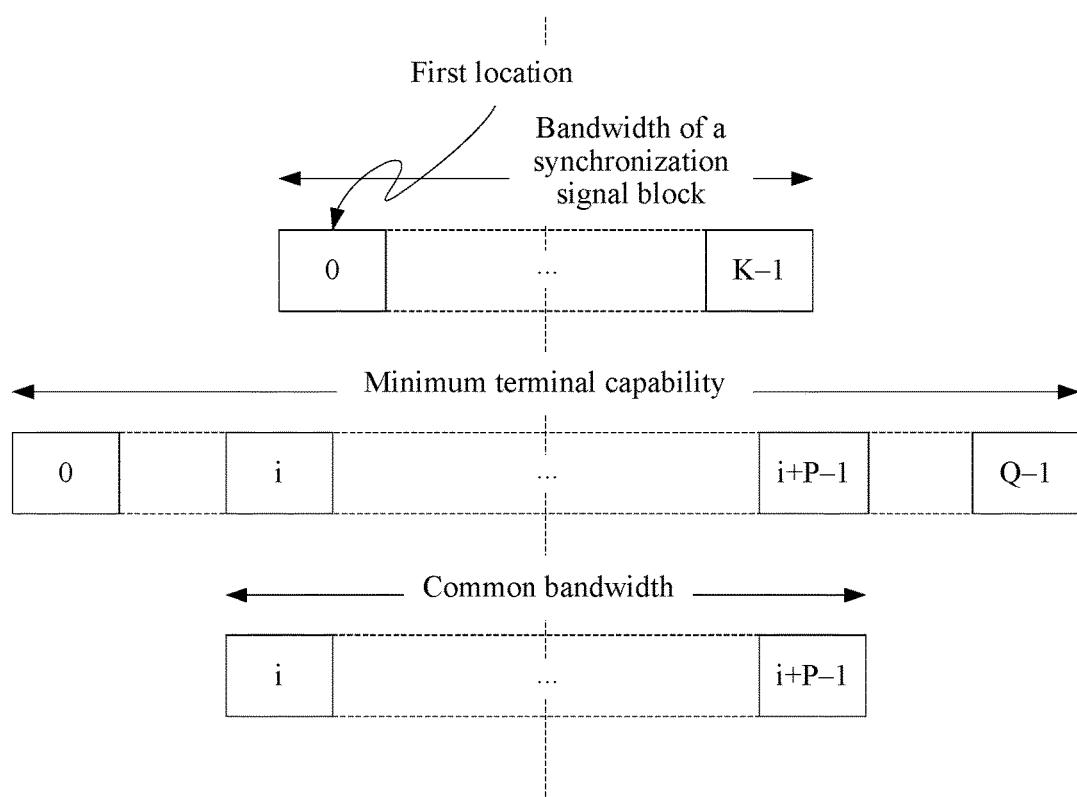
FIG. 5b is still another schematic diagram of a manner of determining a first PRB index.

Optionally, FIG. 5b is still another schematic diagram of the manner of determining the first PRB index. As shown in FIG. 5b, the first PRB index $\{0, 1, \ldots, Q-1\}$ is a common downlink PRB index. A PRB corresponding to an index 0 may be determined based on the first location in frequency domain and the first bandwidth, and on the basis of this, a PRB corresponding to a maximum index may be determined based on the first bandwidth. The first location is the frequency domain location of the synchronization signal block, and the first bandwidth is determined based on the minimum terminal bandwidth capability. Optionally, the first bandwidth is the minimum terminal bandwidth capability.

Figure 5C:
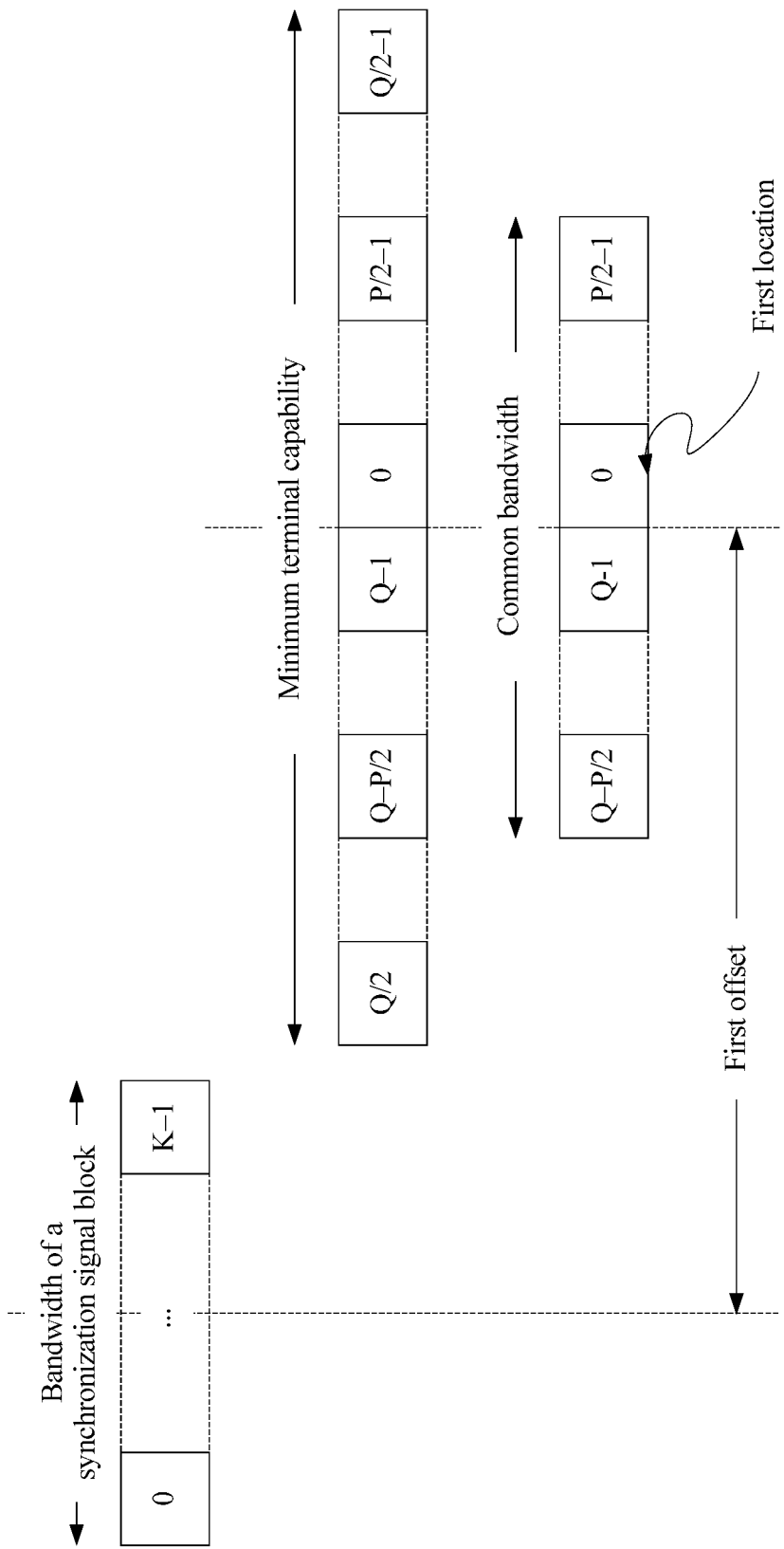
FIG. 5c is still another schematic diagram of a manner of determining a first PRB index.

Optionally, FIG. 5c is still another schematic diagram of the manner of determining the first PRB index. As shown in FIG. 5c, the first PRB index $\{0, 1, \ldots, Q-1\}$ is a common downlink PRB index. A PRB corresponding to an index 0 may be determined based on the first location in frequency domain, and on the basis of this, a PRB corresponding to a maximum index may be determined based on the first bandwidth. The first location is determined based on the first information, and the first bandwidth is determined based on the minimum terminal bandwidth capability. Optionally, the first bandwidth is the minimum terminal bandwidth capability.

Figure 5D:
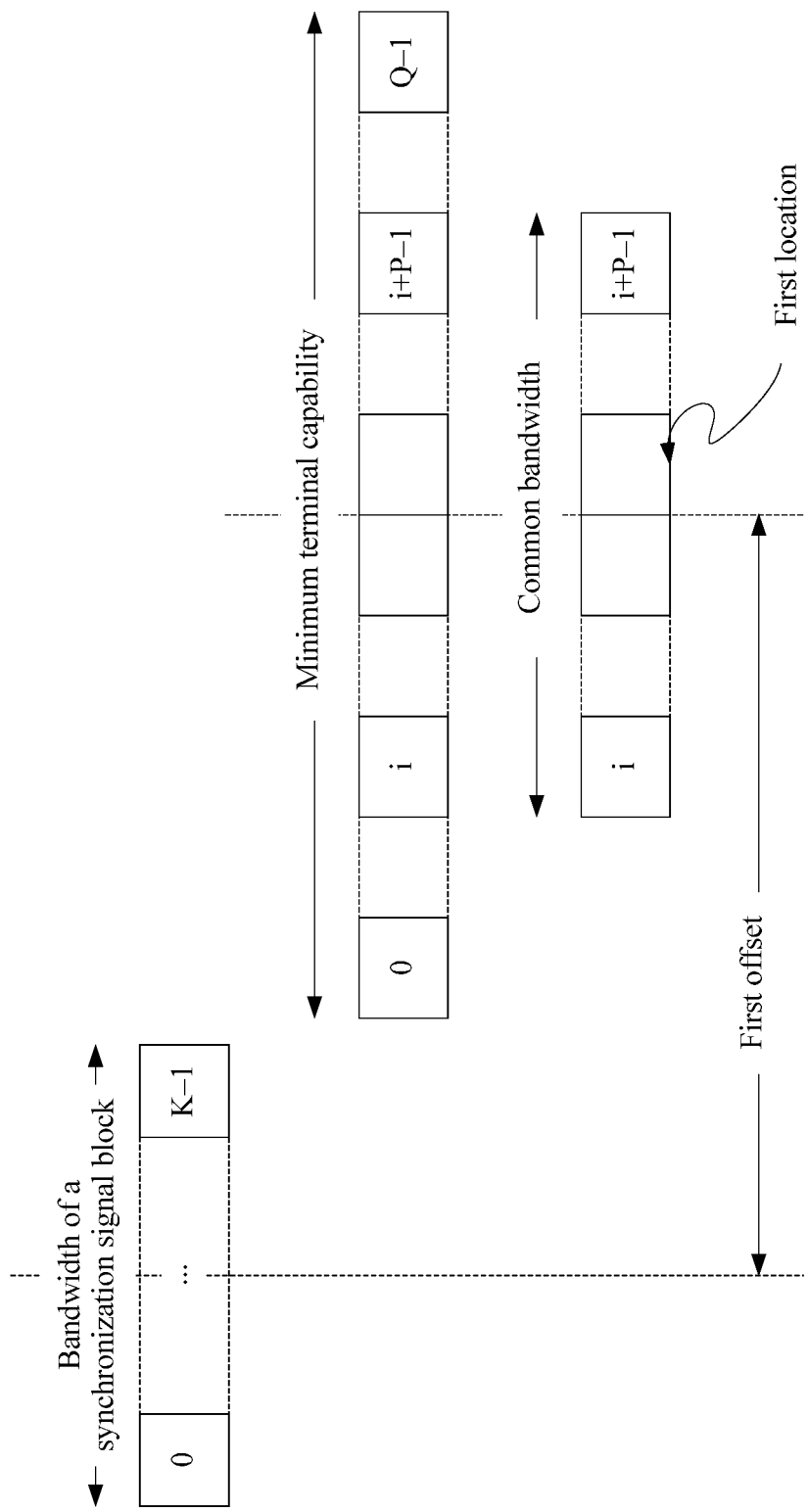
FIG. 5d is still another schematic diagram of a manner of determining a first PRB index.

Optionally, FIG. 5d is still another schematic diagram of the manner of determining the first PRB index. As shown in FIG. 5d, the first PRB index $\{0, 1, \ldots, Q-1\}$ is a common downlink PRB index. A PRB corresponding to an index 0 may be determined based on the first location in frequency domain and the first bandwidth, and on the basis of this, a PRB corresponding to a maximum index may be determined based on the first bandwidth. The first location is determined based on the first information, and the first bandwidth is determined based on the minimum terminal bandwidth capability. Optionally, the first bandwidth is the minimum terminal bandwidth capability.

It should be noted that numbering of PRBs in the first PRB index shown in FIG. 5a to FIG. 5d is merely an example. Certainly, the PRBs in the first PRB index may be numbered in another manner, for example, the PRBs are numbered from right to left, or the PRBs are numbered from middle to right and then are numbered from the left. When the PRBs in the first PRB index are numbered in another manner, the manner of determining the first PRB index is similar to the determining manners shown in FIG. 5a to FIG. 5d, and details are not described herein again.

Optionally, the terminal may determine, based on the first PRB index, a sub-band resource on which a SIB is located and/or a PDCCH resource for scheduling the SIB, that is, a common bandwidth resource shown in FIG. 5a to FIG. 5d. The terminal performs blind detection on the synchronization signal block based on a synchronization signal raster, and the synchronization signal block includes a primary synchronization signal, a secondary synchronization signal, and a PBCH. The terminal determines, based on an MIB carried on the PBCH, the sub-band resource on which the SIB is located. The sub-band resource includes a frequency domain location and a bandwidth of the sub-band or includes only a frequency domain location of the sub-band. A definition of the frequency domain location of the sub-band is the same as the definition of the frequency domain location of the synchronization signal block, and details are not described herein again. Alternatively, the terminal determines, based on an MIB carried on the PBCH, the PDCCH resource for scheduling the SIB. The PDCCH resource includes a frequency domain location and a bandwidth of the PDCCH resource or includes only a frequency domain location of the PDCCH resource. A definition of the frequency domain location of the PDCCH resource is the same as the definition of the frequency domain location of the synchronization signal block, and details are not described herein again. Then the terminal determines, based on the PDCCH resource or DCI carried on the PDCCH, the sub-band resource on which the SIB is located.

Optionally, based on the first PRB index, the terminal receives, on the sub-band on which the SIB is located, at least one of a DMRS for demodulating a common downlink control channel, the common downlink control channel, a DMRS for demodulating a common downlink data channel, the common downlink data channel, a DMRS for demodulating a terminal-specific control channel, the terminal-specific control channel, a DMRS for demodulating a terminal-specific data channel, and the terminal-specific data channel. A data channel is a shared channel, the common downlink data channel includes at least a downlink data channel scheduled by using common downlink control information, the common downlink data channel includes at least a common downlink data channel corresponding to the SIB, and a terminal-specific downlink data channel includes at least a downlink data channel scheduled by using terminal downlink control information. Optionally, the terminal may further receive, on the PDCCH resource based on the first PRB index, common downlink control information including common downlink control information for scheduling a common downlink data channel corresponding to the SIB and/or terminal-specific downlink control information for scheduling a terminal-specific downlink data channel. Because the terminal does not report a bandwidth capability before completing access, to ensure that all terminals can correctly receive a SIB and/or a PDCCH, the bandwidth of the sub-band and/or the bandwidth of the PDCCH resource do/does not exceed the minimum terminal bandwidth capability. Therefore, the first bandwidth may be the minimum terminal bandwidth capability.

To be specific, it is specified that the first PRB index is within a second virtual bandwidth, and the second virtual bandwidth is determined based on the frequency domain location of the synchronization signal block or the first location in frequency domain that is indicated by the base station and the minimum terminal bandwidth capability. Optionally, the second virtual bandwidth is aligned with a location of a central PRB of a common bandwidth or a location of one of subcarrier 0, subcarrier 5, subcarrier 6, and subcarrier 11 of the PRB or a location at a shift of ½ subcarrier spacing from the subcarrier. The second virtual bandwidth may also be referred to as a first minimum virtual bandwidth, a second nominal bandwidth, or a first minimum nominal bandwidth, and this is not limited in the present invention.

In particular, the base station may determine a sequence of a downlink reference signal based on the first PRB index, the base station maps a part or all of the sequence of the downlink reference signal to at least one RE, and the base station sends the downlink reference signal on the at least one RE. The downlink reference signal may be a DMRS, and the DMRS may be used to demodulate at least one of the following channels: the common downlink data channel including at least the common downlink data channel corresponding to the SIB, a common downlink control channel including at least a common downlink control channel for scheduling the common downlink data channel corresponding to the SIB, a terminal-specific downlink control channel, and the terminal-specific downlink data channel.

In this embodiment of this application, that the base station determines a DMRS sequence, and maps a part or all of the sequence to an RE is used as an example for description. A manner of determining a sequence of another reference signal is similar to a manner of determining the DMRS sequence, and details are not described herein. Optionally, the another reference signal includes a CSI-RS and/or a PT-RS.

In a possible implementation, the DMRS sequence is defined by using the minimum terminal bandwidth capability. Specifically, the DMRS sequence may be generated according to a formula (6):

$$r(m) = \frac{1}{\sqrt{2}}(1 - 2 \cdot c(2m)) + j\frac{1}{\sqrt{2}}(1 - 2 \cdot c(2m+1)), \quad (6)$$

$$m = 0, 1, \ldots, A \cdot Q - 1$$

In the formula, r(m) is the DMRS sequence, c(m) is a pseudo sequence, Q is the minimum terminal bandwidth capability, and A represents a quantity of REs that are of a first frequency domain unit in frequency domain and a first time unit in time domain and that are used for transmitting the DMRS. The first frequency domain unit includes 12K subcarriers, K is a positive integer, and the first time unit may be a symbol, a symbol group, a timeslot, a timeslot group, a subframe, or the like. Specific content of the first time unit is not limited in this embodiment. Optionally, when it is specified that a sequence of a reference signal is within a subframe, A may be determined based on a system parameter set corresponding to a sub-band on which the reference signal is located, and the system parameter set includes a subcarrier spacing and/or a CP type. Optionally, when the DMRS is used to demodulate at least a PDCCH for scheduling a downlink data channel corresponding to the SIB and/or the terminal-specific downlink control channel, A is determined based on a quantity of symbols included in the PDCCH resource in time domain.

After the DMRS sequence is generated, in an example of FIG. 5b and FIG. 5d, a part of the DMRS sequence may be mapped to an RE according to a formula (7):

$$a_{k,l}^{(p)} = G_2(r(m')) \quad (7)$$

In the formula, m'=m+$a_1$−$b_1$, m=0, 1, . . . , B·P−1, $a_1$=B·⌊Q/2⌋ or $a_1$=B·⌈Q/2⌉, and $b_1$=B·⌊P/2⌋ or $b_1$=B·⌈Q/2⌉, where $G_2(\bullet)$ is a predefined function, k is an index of a subcarrier in frequency domain, l is an index of a symbol in time domain, p is an antenna port number, $a_{k,l}^{(p)}$ is a complex-valued modulation symbol corresponding to the antenna port number p on an RE (k,l), and B represents a quantity of REs that are of a second frequency domain unit in frequency domain and a second time unit in time domain and that are used for transmitting the DMRS. The second frequency domain unit includes 12L subcarriers, L is a positive integer, and the second time unit may be a symbol, a symbol group, a timeslot, a timeslot group, a subcarrier, or the like. Specific content of the second time unit is not limited in this embodiment. Optionally, when it is specified that a sequence of a reference signal is within a subframe, B is determined based on a system parameter set corresponding to a sub-band on which the DMRS is located, and the system parameter set includes a subcarrier spacing and/or a CP type. Optionally, B is determined based on a quantity of symbols included in the PDCCH resource in time domain.

Optionally, the second virtual bandwidth is aligned with a location of a lowest PRB of the common bandwidth or a location of one of subcarrier 0, subcarrier 5, subcarrier 6, and subcarrier 11 of the PRB or a location at a shift of ½ subcarrier spacing from the subcarrier. In this case, when a part of the DMRS sequence is mapped to an RE, m'=0, 1, . . . , B·P−1.

In this embodiment, without learning of a carrier bandwidth or a location of the synchronization signal block on a carrier, the terminal may correctly receive, based on the first PRB index, at least one of the following channels: the common downlink data channel including at least the common downlink data channel corresponding to the SIB, the common downlink control channel including at least the common downlink control channel for scheduling the common downlink data channel corresponding to the SIB, the terminal-specific downlink control channel, and the terminal-specific downlink data channel. In addition, the common downlink data channel including at least the common downlink data channel corresponding to the SIB and/or the terminal-specific downlink control channel are/is confined in a common bandwidth that is not greater than the minimum terminal bandwidth capability, so as to reduce a size of DCI and improve communication robustness.

Step 202: The terminal transmits and/or receives terminal-specific information based on a second PRB index, where the second PRB index is determined based on a second bandwidth and/or a second location in frequency domain. Optionally, different subcarrier spacings are corresponding to respective second PRB indexes.

In particular, the second PRB index is a PRB index used after a connection is established between the terminal and the base station, or the second PRB index is a PRB index used after the terminal receives a SIB.

In this embodiment, the terminal may send the terminal-specific information to the base station based on the second PRB index, or may receive, based on the second PRB index, terminal-specific information sent by the base station. The second PRB index may be determined only based on the second bandwidth, or may be determined only based on the second location, or may be determined based on the second bandwidth and the second location.

The second bandwidth is determined based on the maximum carrier bandwidth or is not greater than a terminal bandwidth capability. Optionally, the second bandwidth is a positive integer multiple of the maximum carrier bandwidth. The maximum carrier bandwidth is a maximum quantity of PRBs that are included in a carrier, or a quantity of PRBs that can be simultaneously sent/received by the base station. Optionally, the maximum carrier bandwidth is determined based on a subcarrier spacing corresponding to the second PRB index. Optionally, the maximum carrier bandwidth may be a maximum downlink carrier bandwidth or a maximum uplink carrier bandwidth. The terminal bandwidth capability is a maximum bandwidth that can be supported by the terminal, to be specific, a maximum quantity of PRB blocks that can be simultaneously transmitted and/or received by the terminal. Optionally, the terminal bandwidth capability may be a terminal downlink bandwidth capability or a terminal uplink bandwidth capability. The terminal may receive data and/or signaling by using a downlink bandwidth, and may send data and/or signaling by using an uplink bandwidth.

The second location is a carrier central location or is determined based on second information. The carrier central location may be a point corresponding to k'=0 in a baseband signal generation formula (8):

$$s_l^{(p,\mu)}(t) = \sum_{K_-}^{K_+} \alpha_{k',l}^{(p,\mu)} \cdot e^{j2\pi k \Delta f(t - N_{CP,l} T_s)} \quad (8)$$

In the formula, p is an antenna port number, μ is corresponding to a subcarrier spacing configuration, l is a symbol start location, $s_l^{(p,\mu)}(t)$ is a baseband signal corresponding to the antenna port number p and the subcarrier spacing configuration μ in a $t^{th}$ timeslot, $K_+=\lceil N_{RB}^\mu N_{sc}^{RB}/2 \rceil$, $K_-=\lfloor N_{RB}^\mu N_{sc}^{RB}/2 \rfloor$, $N_{RB}^\mu$ is a carrier bandwidth, $N_{sc}^{RB}$ is a quantity of subcarriers included in a PRB, $\alpha_{k',l}^{(p,\mu)}$ is a complex value corresponding to the antenna port number p and the subcarrier spacing configuration μ on an RE (k',l), $N_{CP,l}$ is determined based on a CP type and/or the symbol start location, and $T_s$ is a time unit. The carrier central location may be a location of a PRB corresponding to an intermediate index on a carrier or a location of a lowest subcarrier (subcarrier 0) or a central subcarrier (subcarrier 5 or subcarrier 6) or a highest subcarrier (subcarrier 11) of the PRB or a location at a shift of ½ subcarrier spacing from the subcarrier. In particular, when a downlink carrier includes 2N PRBs, the carrier central location is a location of an $(N-1)^{th}$ PRB or a location of subcarrier 11 of the PRB or a location at a shift of ½ subcarrier spacing from the subcarrier; when a downlink carrier includes 2N+1 PRBs, the carrier central location is a location of an $N^{th}$ PRB or a location of one of subcarrier 0, subcarrier 5, subcarrier 6, and subcarrier 11 of the PRB or a location at a shift of ½ subcarrier spacing from the subcarrier. Optionally, the carrier central location may be a downlink carrier central location or an uplink carrier central location. In addition, the second location may be further determined based on the second information. The second location may be a location of a PRB, a location of one of subcarrier 0, subcarrier 5, subcarrier 6, and subcarrier 11 of a PRB, or a location at a shift of ½ subcarrier spacing from one of subcarrier 0, subcarrier 5, subcarrier 6, and subcarrier 11 of a PRB. In actual use, the base station may add the second information for configuring the second location to some higher layer signaling and send the higher layer signaling to the terminal. In particular, the second information may be indicated by using an MIB, a SIB, or radio resource control (RRC) signaling. Optionally, the second information indicates a second offset between the second location and a frequency domain reference location. The frequency domain reference location may be a location of the synchronization signal block, or may be a frequency domain location indicated by the base station by using higher layer signaling.

The following describes in detail a manner of determining the second PRB index.

A fourth possible embodiment is provided below.

Figure 6A:
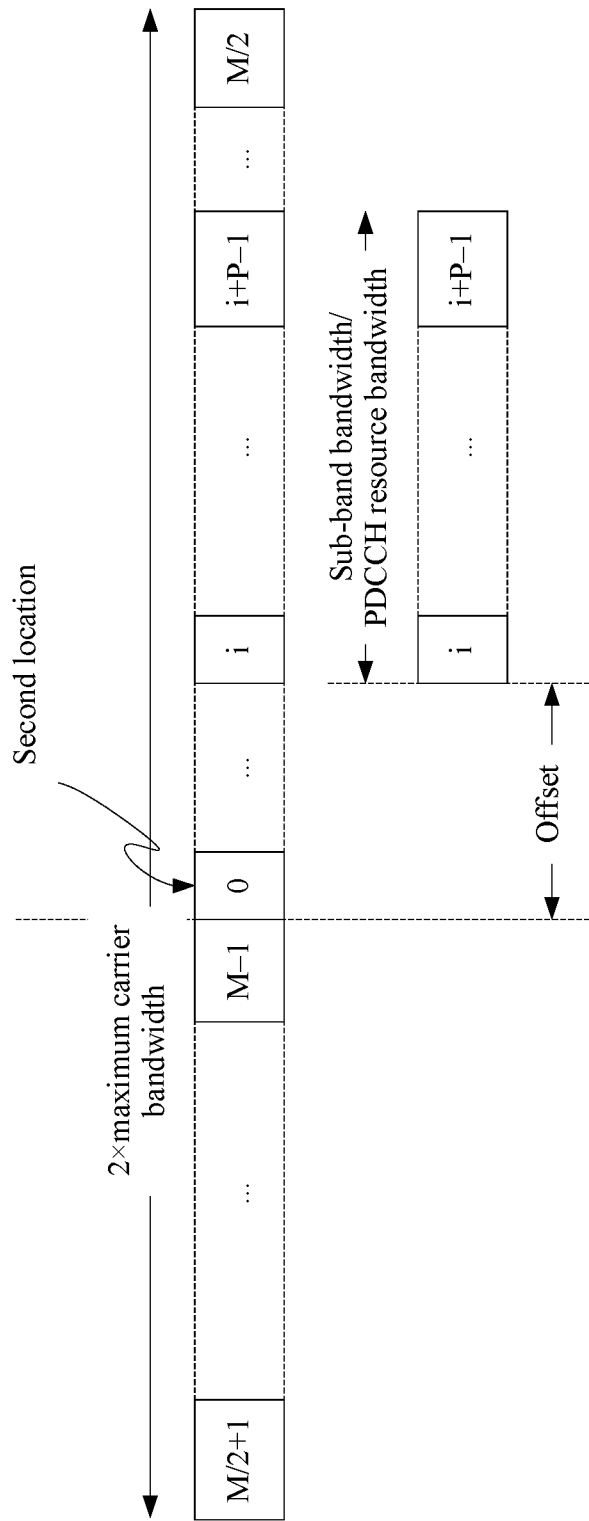
FIG. 6a is still another schematic diagram of a manner of determining a second PRB index.

Optionally, FIG. 6a is still another schematic diagram of the manner of determining the second PRB index. As shown in FIG. 6a, the second PRB index {0, 1, . . . , M−1} is a common PRB index. A PRB corresponding to an index 0 may be determined based on the second location in frequency domain, and on the basis of this, a PRB corresponding to a maximum index may be determined based on the second bandwidth. The second location is the carrier central location or is determined based on the second information, and the second bandwidth is determined based on the maximum carrier bandwidth. In particular, when the second location is the carrier central location, the second bandwidth is the maximum carrier bandwidth. Optionally, the common PRB index may be a common downlink PRB index or a common uplink PRB index. Correspondingly, the carrier central location may be a downlink carrier central location or an uplink carrier central location. Correspondingly, the maximum carrier bandwidth may be a maximum downlink carrier bandwidth or a maximum uplink carrier bandwidth.

Figure 6B:
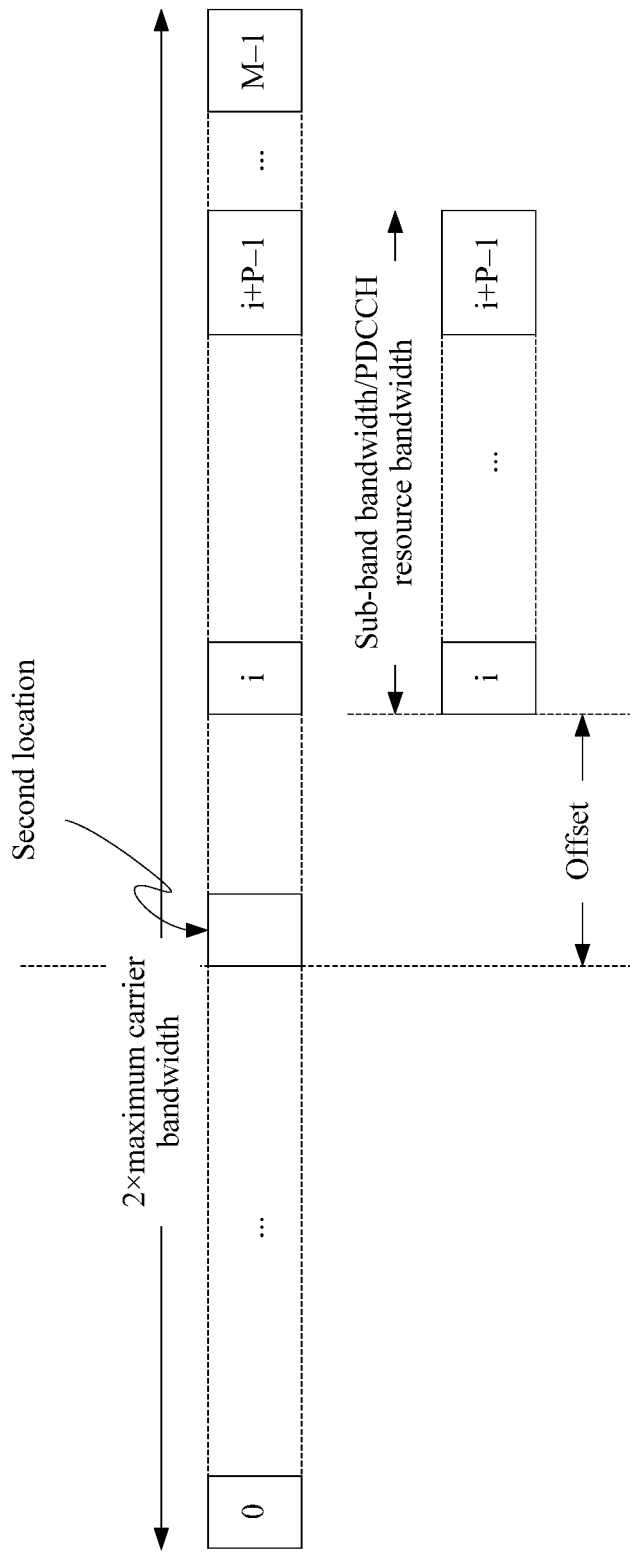
FIG. 6b is still another schematic diagram of a manner of determining a second PRB index.

Optionally, FIG. 6b is still another schematic diagram of the manner of determining the second PRB index. As shown in FIG. 6b, the second PRB index {0, 1, . . . , M−1} is a common PRB index. A PRB corresponding to an index 0 may be determined based on the second location in frequency domain and the second bandwidth, and on the basis of this, a PRB corresponding to a maximum index may be determined based on the second bandwidth. The second location is the carrier central location or is determined based on the second information, and the second bandwidth is determined based on the maximum carrier bandwidth. In particular, when the second location is the carrier central location, the second bandwidth is the maximum carrier bandwidth. Optionally, the common PRB index may be a common downlink PRB index or a common uplink PRB index. Correspondingly, the carrier central location may be a downlink carrier central location or an uplink carrier central location. Correspondingly, the maximum carrier bandwidth may be a maximum downlink carrier bandwidth or a maximum uplink carrier bandwidth.

It should be noted that numbering of PRBs in the second PRB index shown in FIG. 6a and FIG. 6b is merely an example. Certainly, the PRBs in the second PRB index may be numbered in another manner, for example, the PRBs are numbered from right to left, or the PRBs are numbered from middle to right and then are numbered from the left. When the PRBs in the second PRB index are numbered in another manner, the manner of determining the second PRB index is similar to the determining manners shown in FIG. 6a and FIG. 6b, and details are not described herein again.

Optionally, the terminal may determine a sub-band resource and/or a PDCCH resource based on the second PRB index. As shown in FIG. 6a and FIG. 6b, a downlink sub-band resource and/or a downlink PDCCH resource are/is determined based on the common downlink PRB index, and/or an uplink sub-band resource and/or an uplink PDCCH resource are/is determined based on the common uplink PRB index. The terminal determines the sub-band resource based on a SIB or RRC signaling. The sub-band may be a sub-band corresponding to common downlink data channel information or may be a downlink carrier bandwidth part and/or an uplink carrier bandwidth part of the terminal. The sub-band resource includes a frequency domain location and a bandwidth of the sub-band or includes only a frequency domain location of the sub-band. A definition of the frequency domain location of the sub-band is the same as the definition of the frequency domain location of the synchronization signal block in step 201, and details are not described herein again. Alternatively, the terminal determines the PDCCH resource based on a SIB or RRC signaling. The PDCCH resource is used to schedule common downlink data channel information and/or terminal downlink data channel information. The PDCCH resource includes a frequency domain location and a bandwidth of the PDCCH resource or includes only a frequency domain location of the PDCCH resource. A definition of the frequency domain location of the PDCCH resource is the same as the definition of the frequency domain location of the synchronization signal block in step 201, and details are not described herein again.

Optionally, the terminal may further transmit and/or receive, on the sub-band based on the second PRB index, at least one of a DMRS for demodulating a common downlink control channel, the common downlink control channel, a DMRS for demodulating a common downlink data channel, the common downlink data channel, a DMRS for demodulating a terminal-specific control channel, the terminal-specific control channel, a DMRS for demodulating a terminal-specific data channel, and the terminal-specific data channel. A data channel is a shared channel, the common downlink data channel includes at least a downlink data channel scheduled by using common downlink control information, and the terminal-specific data channel includes at least an uplink/downlink data channel scheduled by using terminal downlink control information. Optionally, the terminal may receive, on the PDCCH resource based on the second PRB index, common downlink control information for scheduling a common downlink data channel and/or terminal-specific downlink control information for scheduling a terminal-specific data channel. The terminal may receive data by using a downlink data channel, and may further send data by using an uplink data channel.

To be specific, it is specified that the second PRB index is within a third virtual bandwidth, and the third virtual bandwidth is determined based on the carrier central location or the second location in frequency domain that is indicated by the base station and the maximum carrier bandwidth. Optionally, a location of a central PRB of the third virtual bandwidth or a location of one of subcarrier 0, subcarrier 5, subcarrier 6, and subcarrier 11 of the PRB or a location at a shift of ½ subcarrier spacing from the subcarrier is the central location or the second location in frequency domain that is indicated by the base station. The third virtual bandwidth may also be referred to as a second maximum virtual bandwidth, a third nominal bandwidth, or a second maximum nominal bandwidth, and this is not limited in the present invention.

In particular, the base station may determine a sequence of a downlink reference signal based on the second PRB index, the base station maps a part or all of the sequence of the downlink reference signal to at least one RE, and the base station sends the downlink reference signal on the at least one RE. The downlink reference signal may be a DMRS, and the DMRS may be used to demodulate at least one of the following channels: a PDCCH for scheduling a common downlink data channel, a common downlink data channel, a terminal-specific downlink control channel, and a terminal-specific downlink data channel.

In this embodiment of this application, that the base station determines a DMRS sequence, and maps a part or all of the sequence to an RE is used as an example for description. A manner of determining a sequence of another reference signal is similar to a manner of determining the DMRS sequence, and details are not described herein. Optionally, the another reference signal includes a CSI-RS, a PT-RS, an uplink DMRS, and a sounding reference signal (SRS).

In a possible implementation, the DMRS sequence is defined by using the second PRB index. Specifically, a method for generating the DMRS sequence is the same as the DMRS sequence generation method in the first possible embodiment, that is, the DMRS sequence may be generated according to the formula (1). When the generated DMRS sequence is mapped to an RE, the terminal may determine, based on the frequency domain location of the sub-band, a number that is of each PRB on the sub-band and that is corresponding to the second PRB index, so as to determine a transmitted and/or received reference signal. Specifically, a method for mapping the DMRS sequence is the same as the DMRS sequence mapping method in the first possible embodiment, that is, the DMRS sequence may be mapped according to the formula (2). Alternatively, the terminal may determine, based on the frequency domain location of the PDCCH resource, a number that is of a PRB on which each REG on the PDCCH resource is located and that is corresponding to the second PRB index, so as to determine a transmitted and/or receive reference signal. Specifically, a method for mapping the DMRS sequence is the same as the DMRS sequence mapping method in the first possible embodiment, that is, the DMRS sequence may be mapped according to the formula (3).

Optionally, when the generated DMRS sequence is mapped to an RE, the second PRB index may be represented by using a terminal-specific PRB index and an offset between the frequency domain location of the sub-band or the frequency domain location of the PDCCH resource and the second location, and it is specified that the terminal-specific PRB index is within the bandwidth of the sub-band or the bandwidth of the PDCCH resource. In an example of FIG. 6b, $n_{CPRB}=\alpha+n_{offset}+n_{UPRB}$, where $\alpha=\lfloor M/2 \rfloor$ or $\alpha=\lceil M/2 \rceil$, $n_{offset}$ is the offset between the frequency domain location of the sub-band or the frequency domain location of the PDCCH resource and the second location, and $n_{UPRB}$ is the terminal-specific PRB index.

Equivalently, the terminal-specific PRB index may be represented by using the second PRB index and the offset between the frequency domain location of the sub-band or the frequency domain location of the PDCCH resource and the second location.

In addition, when PRB grids before and after initial access are consistent, the following case exists: For two terminals configured with MU-MIMO, after initial access, one terminal is camped on a sub-band for receiving a SIB, another terminal is configured with a bandwidth part, and the bandwidth part (partially or completely) overlaps with the sub-band. To configure multi-user multiple-input multiple-output (MU-MIMO) for the two terminals, reference symbols on PRBs with a same index in bandwidth parts of the two terminals need to be the same. In this case, the base station semi-statically configures a third offset δ (for example, by using RRC signaling). When the generated DMRS sequence is mapped to an RE, the terminal may determine, based on the frequency domain location of the sub-band, a number that is of each PRB on the sub-band and that is corresponding to the second PRB index, so as to determine a transmitted and/or received reference signal. Specifically, the DMRS sequence may be mapped according to a formula (9) or a formula (10):

$$a_{k,l}^{(p)}=F_1(r(B \cdot n_{CPRB},\delta)) \tag{9}$$

$$a_{k,l}^{(p)}=F_1(r(B \cdot n_{UPRB},\delta)) \tag{10}$$

Alternatively, the terminal may determine, based on the frequency domain location of the PDCCH resource, a number that is of a PRB on which each REG on the PDCCH resource is located and that is corresponding to the second PRB index, so as to determine a transmitted and/or received reference signal. Specifically, the DMRS sequence may be mapped according to a formula (11):

$$a_{k,l}^{(p)}=F_2(r(B \cdot n_{CCE},\delta)) \tag{11}$$

In this embodiment, without learning of a carrier bandwidth, the terminal may correctly transmit and/or receive, based on the second PRB index, at least one of the following channels: the common downlink control channel, the common downlink data channel, the terminal-specific control channel, and the terminal-specific data channel, and at least one of the following signals: the DMRS for demodulating the common downlink control channel, the DMRS for demodulating the common downlink data channel, the DMRS for demodulating the terminal-specific control channel, and the DMRS for demodulating the terminal-specific data channel. The terminal may receive data by using a downlink data channel, and may further send data by using an uplink data channel. The terminal may receive signaling by using a downlink control channel.

In addition, because the two terminals configured with sub-band resources or PDCCH resources that completely overlap or partially overlap have a same understanding on a number of a PRB in an overlapped part, reference signal sequences mapped to all PRBs have a same sequence value. In this case, MU-MIMO may be configured for the two terminals, thereby improving a system throughput. Herein, in addition to the sub-band that is corresponding to the common downlink data channel information and that is determined based on the SIB or the RRC signaling, and the downlink carrier bandwidth part and/or the uplink carrier bandwidth part of the terminal, the sub-band resource includes a sub-band corresponding to common downlink data channel information configured by using an MIB.

A fifth possible embodiment is provided below.

Figure 7A:
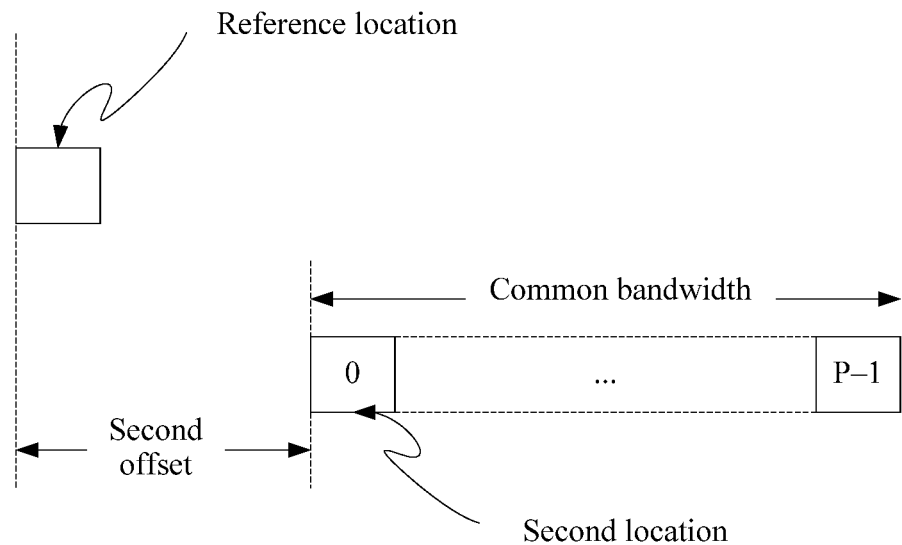
FIG. 7a is still another schematic diagram of a manner of determining a second PRB index.

Optionally, FIG. 7a is still another schematic diagram of the manner of determining the second PRB index. As shown in FIG. 7a, the second PRB index {0, 1, . . . , P−1} is a common downlink PRB index. A PRB corresponding to an index 0 may be determined based on the second location in frequency domain, and on the basis of this, a PRB corresponding to a maximum index may be determined based on the second bandwidth. The second location is determined based on the second information, and the second bandwidth is not greater than the terminal bandwidth capability or is determined based on the minimum terminal bandwidth capability. Optionally, the second bandwidth is the minimum terminal bandwidth capability.

Figure 7B:
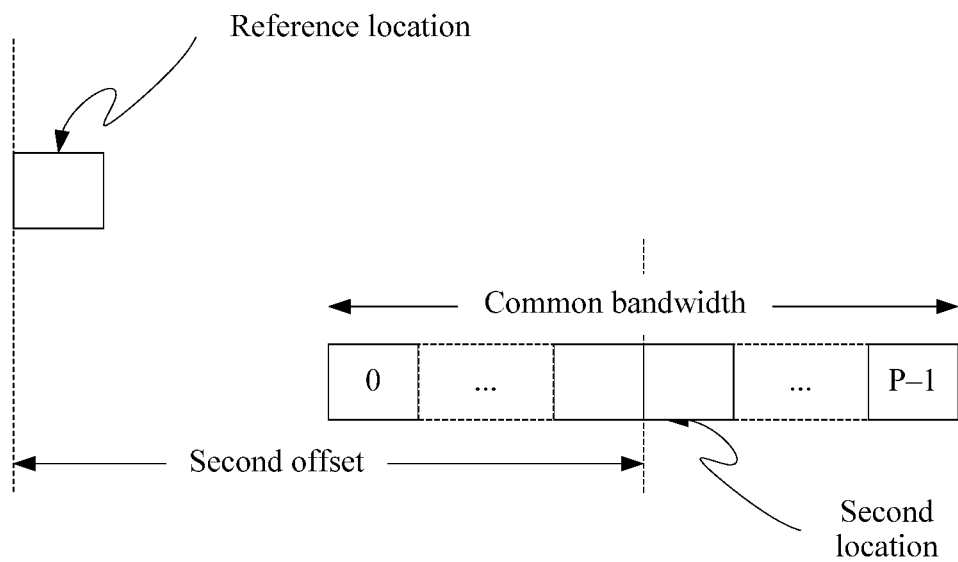
FIG. 7b is still another schematic diagram of a manner of determining a second PRB index.

Optionally, FIG. 7b is still another schematic diagram of the manner of determining the second PRB index. As shown in FIG. 7b, the second PRB index {0, 1, . . . , P−1} is a common downlink PRB index. A PRB corresponding to an index 0 may be determined based on the second location in frequency domain and the second bandwidth, and on the basis of this, a PRB corresponding to a maximum index may be determined based on the second bandwidth. The second location is determined based on the second information, and the second bandwidth is not greater than the terminal bandwidth capability or is determined based on the minimum terminal bandwidth capability. Optionally, the second bandwidth is the minimum terminal bandwidth capability.

It should be noted that numbering of PRBs in the second PRB index shown in FIG. 7a and FIG. 7b is merely an example. Certainly, the PRBs in the second PRB index may be numbered in another manner, for example, the PRBs are numbered from right to left, or the PRBs are numbered from middle to right and then are numbered from the left. When the PRBs in the second PRB index are numbered in another manner, the manner of determining the second PRB index is similar to the determining manners shown in FIG. 7a and FIG. 7b, and details are not described herein again.

The terminal determines a sub-band resource based on a SIB or RRC signaling. The sub-band may be a sub-band corresponding to common downlink data channel information. The sub-band resource includes a frequency domain location and a bandwidth of the sub-band or includes only a frequency domain location of the sub-band. Optionally, a definition of the frequency domain location of the sub-band is the same as the definition of the frequency domain location of the synchronization signal block in step 201, and details are not described herein again. Alternatively, the terminal determines a PDCCH resource based on a SIB or RRC signaling. The PDCCH resource is used to schedule common downlink data channel information. The PDCCH resource includes a frequency domain location and a bandwidth of the PDCCH resource or includes only a frequency domain location of the PDCCH resource. A definition of the frequency domain location of the PDCCH resource is the same as the definition of the frequency domain location of the synchronization signal block in step 201, and details are not described herein again. Therefore, the terminal may determine the sub-band resource and/or the PDCCH resource, as shown in FIG. 7a and FIG. 7b.

Optionally, the terminal may receive, on the sub-band based on the second PRB index, at least one of a DMRS for demodulating a common downlink data channel, the common downlink data channel, a DMRS for demodulating a common downlink control channel, and the common downlink control channel. A data channel is a shared channel, and the common downlink data channel includes at least a downlink data channel scheduled by using common downlink control information. Optionally, the terminal may receive, on the PDCCH resource based on the second PRB index, common downlink control information for scheduling a common downlink data channel.

In particular, the base station may determine a sequence of a downlink reference signal based on the second PRB index, the base station maps a part or all of the sequence of the downlink reference signal to at least one RE, and the base station sends the downlink reference signal on the at least one RE. The downlink reference signal may be a DMRS, and the DMRS may be used to demodulate at least one of the following channels: a PDCCH for scheduling a common downlink data channel and/or the common downlink data channel.

In this embodiment of this application, that the base station determines a DMRS sequence, and maps a part or all of the sequence to an RE is used as an example for description. A manner of determining a sequence of another reference signal is similar to a manner of determining the DMRS sequence, and details are not described herein. Optionally, the another reference signal includes a CSI-RS and/or a PT-RS.

In a possible implementation, the DMRS sequence is defined by using the second PRB index. Specifically, a method for generating the DMRS sequence is the same as the DMRS sequence generation method in the second possible embodiment, that is, the DMRS sequence may be generated according to the formula (4). When the generated DMRS sequence is mapped to an RE, the terminal may determine, based on the frequency domain location of the sub-band, a number that is of each PRB on the sub-band and that is corresponding to the second PRB index, so as to determine a transmitted and/or received reference signal. Alternatively, the terminal may determine, based on the frequency domain location of the PDCCH resource, a number that is of a PRB on which each REG on the PDCCH resource is located and that is corresponding to the second PRB index, so as to determine a transmitted and/or received reference signal. Specifically, a method for mapping the DMRS sequence is the same as the DMRS sequence mapping method in the second possible embodiment, that is, the DMRS sequence may be mapped according to the formula (5).

In this embodiment, without learning of a carrier bandwidth, the terminal may correctly receive, based on the second PRB index, at least one of the following: the common downlink data channel, the DMRS for demodulating the common downlink data channel, the common downlink control channel, and the DMRS for demodulating the common downlink control channel. In addition, because the common downlink data channel is confined in a common bandwidth that is not greater than the minimum terminal bandwidth capability, so as to reduce a size of DCI and improve communication robustness.

A sixth possible embodiment is provided below.

Figure 8A:
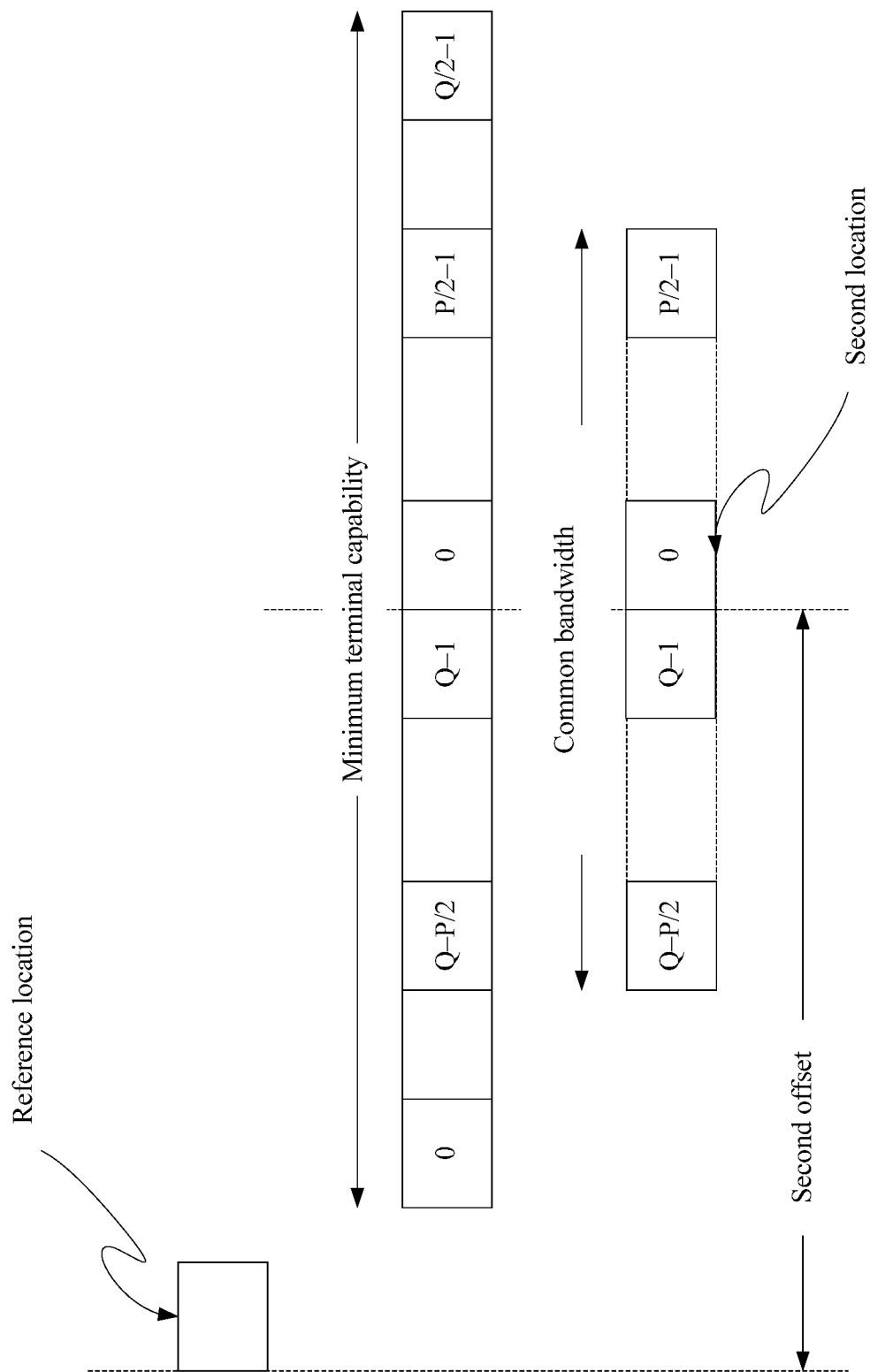
FIG. 8a is still another schematic diagram of a manner of determining a second PRB index.

Optionally, FIG. 8a is still another schematic diagram of the manner of determining the second PRB index. As shown in FIG. 8a, the second PRB index {0, 1, . . . , Q–1} is a common downlink PRB index. A PRB corresponding to an index 0 may be determined based on the second location in frequency domain, and on the basis of this, a PRB corresponding to a maximum index may be determined based on the second bandwidth. The second location is determined based on the second information, and the second bandwidth is the minimum terminal bandwidth capability.

Figure 8B:
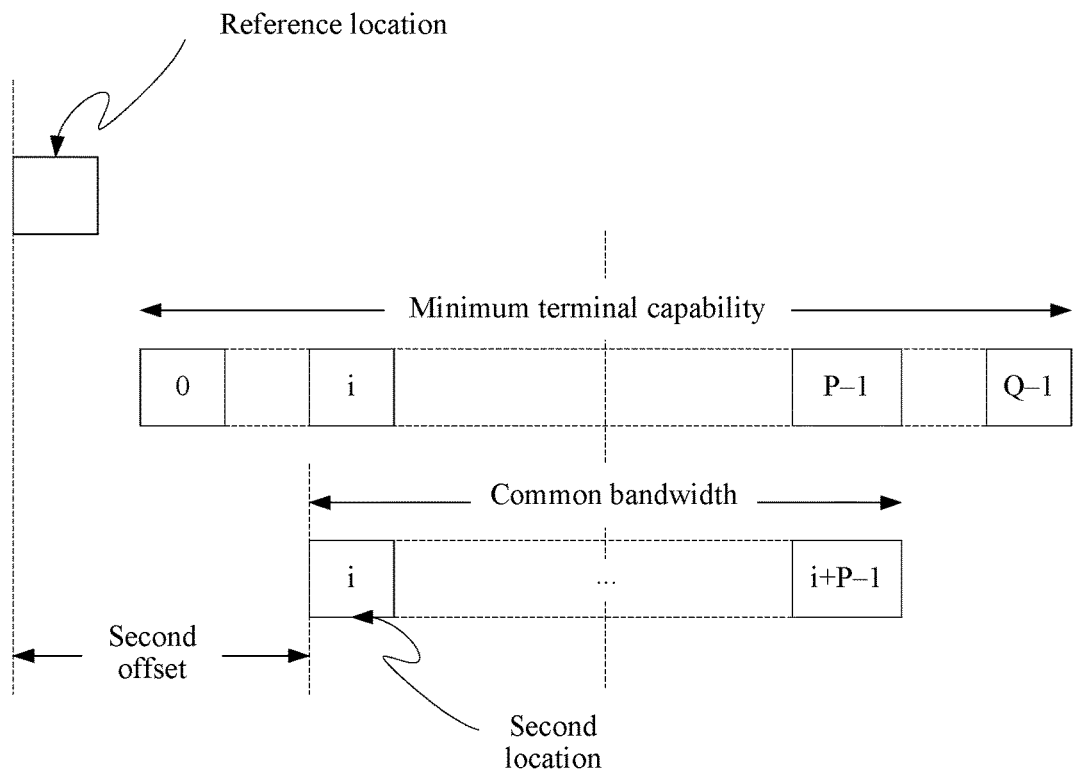
FIG. 8b is still another schematic diagram of a manner of determining a second PRB index.

Optionally, FIG. 8b is still another schematic diagram of the manner of determining the second PRB index. As shown in FIG. 8b, the second PRB index {0, 1, . . . , Q–1} is a common downlink PRB index. A PRB corresponding to an index 0 may be determined based on the second location in frequency domain and the second bandwidth, and on the basis of this, a PRB corresponding to a maximum index may be determined based on the second bandwidth. The second location is determined based on the second information, and the second bandwidth is the minimum terminal bandwidth capability.

It should be noted that numbering of PRBs in the second PRB index shown in FIG. 8a and FIG. 8b is merely an example. Certainly, the PRBs in the second PRB index may be numbered in another manner, for example, the PRBs are numbered from right to left, or the PRBs are numbered from middle to right and then are numbered from the left. When the PRBs in the second PRB index are numbered in another manner, the manner of determining the second PRB index is similar to the determining manners shown in FIG. 8a and FIG. 8b, and details are not described herein again.

The terminal determines a sub-band resource based on a SIB or RRC signaling. The sub-band may be a sub-band corresponding to common downlink data channel information. The sub-band resource includes a frequency domain location and a bandwidth of the sub-band or includes only a frequency domain location of the sub-band. A definition of the frequency domain location of the sub-band is the same as the definition of the frequency domain location of the synchronization signal block in step 201, and details are not described herein again. Alternatively, the terminal determines a PDCCH resource based on a SIB or RRC signaling. The PDCCH resource is used to schedule common downlink data channel information. The PDCCH resource includes a frequency domain location and a bandwidth of the PDCCH resource or includes only a frequency domain location of the PDCCH resource. A definition of the frequency domain location of the PDCCH resource is the same as the definition of the frequency domain location of the synchronization signal block in step 201, and details are not described herein again. Therefore, the terminal may determine the sub-band resource and/or the PDCCH resource, as shown in FIG. 8a and FIG. 8b.

Optionally, the terminal may receive, on the sub-band based on the second PRB index, at least one of a DMRS for demodulating a common downlink data channel, the common downlink data channel, a DMRS for demodulating a common downlink control channel, and the common downlink control channel. A data channel is a shared channel, and the common downlink data channel includes at least a downlink data channel scheduled by using common downlink control information. Optionally, the terminal may receive, on the PDCCH resource based on the second PRB index, common downlink control information for scheduling a common downlink data channel.

To be specific, it is specified that the second PRB index is within a fourth virtual bandwidth, and the fourth virtual bandwidth is determined based on the second location in frequency domain that is indicated by the base station and a minimum terminal capability. Optionally, the fourth virtual bandwidth is aligned with a location of a central PRB of the common bandwidth or a location of one of subcarrier 0, subcarrier 5, subcarrier 6, and subcarrier 11 of the PRB or a location at a shift of ½ subcarrier spacing from the subcarrier. The fourth virtual bandwidth may also be referred to as a second minimum virtual bandwidth, a fourth nominal bandwidth, or a second minimum nominal bandwidth, and this is not limited in the present invention.

In particular, the base station may determine a sequence of a downlink reference signal based on the second PRB index, the base station maps a part or all of the sequence of the downlink reference signal to at least one RE, and the base station sends the downlink reference signal on the at least one RE. The downlink reference signal may be a DMRS, and the DMRS may be used to demodulate at least one of the following channels: a PDCCH for scheduling a common downlink data channel and/or the common downlink data channel.

In this embodiment of this application, that the base station determines a DMRS sequence, and maps a part or all of the sequence to an RE is used as an example for description. A manner of determining a sequence of another reference signal is similar to a manner of determining the DMRS sequence, and details are not described herein. Optionally, the another reference signal includes a CSI-RS and/or a PT-RS.

In a possible implementation, the DMRS sequence is defined by using the second PRB index. Specifically, a method for generating the DMRS sequence is the same as the DMRS sequence generation method in the third possible embodiment, that is, the DMRS sequence may be generated according to the formula (6). When the generated DMRS sequence is mapped to an RE, the terminal may determine a number that is each PRB on the sub-band and that is corresponding to the second PRB index, so as to determine a transmitted and/or received reference signal. Alternatively, the terminal may determine, based on the frequency domain location of the PDCCH resource, a number that is a PRB on which each REG on the PDCCH resource is located and that is corresponding to the second PRB index, so as to determine a transmitted and/or received reference signal. Specifically, a method for mapping the DMRS sequence is the same as the DMRS sequence mapping method in the third possible embodiment, that is, the DMRS sequence may be mapped according to the formula (7).

In this embodiment, without learning of a carrier bandwidth, the terminal may correctly receive, based on the second PRB index, at least one of the following: the common downlink data channel, the DMRS for demodulating the common downlink data channel, the common downlink control channel, and the DMRS for demodulating the common downlink control channel. In addition, because the common downlink data channel is confined in a common bandwidth that is not greater than the minimum terminal bandwidth capability, so as to reduce a size of DCI and improve communication robustness.

A seventh possible embodiment is provided below.

Optionally, the second PRB index is a terminal-specific downlink PRB index. It is specified that the terminal-specific downlink PRB index is within a carrier bandwidth part of the terminal. Optionally, the carrier bandwidth part may be a downlink carrier bandwidth part or an uplink carrier bandwidth part.

The terminal determines a resource of the carrier bandwidth part based on a SIB or RRC signaling. The carrier bandwidth resource includes a frequency domain location and a bandwidth of the carrier bandwidth part or includes only a frequency domain location of the carrier bandwidth part. A definition of the frequency domain location of the carrier bandwidth part is the same as the definition of the frequency domain location of the synchronization signal block in step 201, and details are not described herein again. Alternatively, the terminal determines a PDCCH resource based on a SIB or RRC signaling. The PDCCH resource is used to schedule terminal-specific downlink data channel information. The PDCCH resource includes a frequency domain location and a bandwidth of the PDCCH resource or includes only a frequency domain location of the PDCCH resource. A definition of the frequency domain location of the PDCCH resource is the same as the definition of the frequency domain location of the synchronization signal block in step 201, and details are not described herein again.

Optionally, the terminal may transmit and/or receive a terminal-specific data channel in the carrier bandwidth part based on the second PRB index. The terminal-specific data channel is a terminal-specific shared channel including a terminal-specific downlink data channel and/or a terminal-specific uplink data channel, and the terminal-specific data channel includes at least a data channel scheduled by using terminal downlink control information. Optionally, the terminal may receive, on the PDCCH resource based on the second PRB index, terminal-specific downlink control information for scheduling terminal-specific uplink/downlink data. Transmission may be understood as sending and/or receiving, and this is not limited in this application.

An eighth possible embodiment is provided below.

In a method for allocating a resource in a sub-band, the sub-band may be a common bandwidth, may be a downlink carrier bandwidth part, or may be an uplink carrier bandwidth part.

In the resource allocation method, a resource allocation domain in resource allocation information includes a resource indication value (RIV), and the RIV is corresponding to an offset $RB_{offset}$ of a lowest PRB on the sub-band and a quantity ($L_{CRBs}$) of allocated consecutive RBs or allocated consecutive virtual RBs. The RIV is defined as follows:

If $(L_{CRBs}-1) \leq \lfloor N_{URB}^{\mu}/2 \rfloor$, $RIV = N_{URB}^{\mu,DL}(L_{CRBs}-1) + RB_{offset}$; otherwise, $RIV = N_{URB}^{\mu}(N_{URB}^{\mu}-L_{CRBs}-1) + (N_{URB}^{\mu}-1-RB_{offset})$.

In the formula, $L_{CRBs} \geq 1$ and is not greater than $N_{URB}^\mu - RB_{offset}$, and $N_{URB}^\mu$ represents a quantity of RBs included in a sub-band corresponding to a system parameter configuration µ.

The terminal determines, based on the RIV, that the allocated consecutive RBs or the allocated consecutive virtual RBs are $\{RB_0+RB_{offset}, \ldots, RB_0+RB_{offset}+L_{CRBs}-1\}$, where $RB_0$ is a number that is of the lowest PRB on the sub-band and that is corresponding to a common PRB index, and the common PRB index is the first PRB index in the first possible embodiment and/or the second PRB index in the fourth possible implementation, and the common PRB index is determined based on the maximum carrier bandwidth.

In addition, it can be understood that the foregoing execution sequence of step 201 and step 202 is merely an example. The sequence for performing step 201 and step 202 is not limited. Step 201 may be performed before step 202, or step 202 may be performed before step 201, or the two steps may be simultaneously performed. This is not specifically limited in this embodiment of this application.

It should be noted that, in the foregoing different embodiments, the same or similar concepts or processes may be mutually referred or combined, and division of the different embodiments is merely used to describe this application more clearly.

According to the data communication method provided in this embodiment of this application, the terminal receives the common information based on the first PRB index, and transmits and/or receives the terminal-specific information based on the second PRB index. The first PRB index is determined based on the first bandwidth and/or the first location in frequency domain, and the second PRB index is determined based on the second bandwidth and/or the second location in frequency domain. The terminal may determine the first PRB index based on the first bandwidth and/or the first location in frequency domain, and determine the second PRB index based on the second bandwidth and/or the second location in frequency domain, and the terminal may separately receive the common information, and transmit and/or receive the terminal-specific information based on different PRB indexes. Therefore, the terminal can determine a PRB index, and transmit and/or receive a reference signal and data channel information to the base station based on the determined PRB index.

Figure 9:
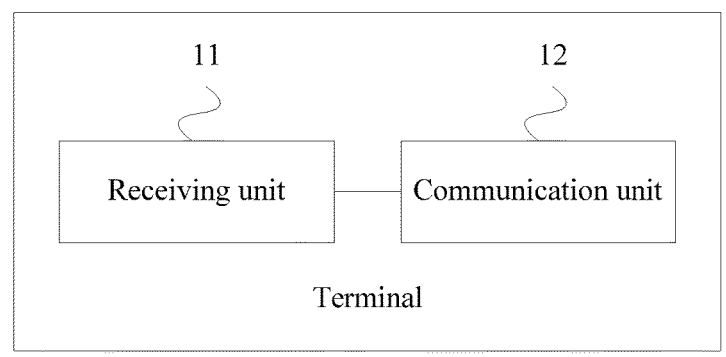
FIG. 9 is a schematic structural diagram of a terminal according to an embodiment of this application.

FIG. 9 is a schematic structural diagram of a terminal according to an embodiment of this application. Referring to FIG. 9, the terminal includes a receiving unit 11 and a communication unit 12.

The receiving unit 11 receives common information based on a first physical resource block index, and the first physical resource block index is determined based on a first bandwidth and/or a first location in frequency domain.

The communication unit 12 transmits and/or receives terminal-specific information based on a second physical resource block index, and the second physical resource block index is determined based on a second bandwidth and/or a second location in frequency domain.

The terminal provided in this embodiment of this application can perform the foregoing corresponding method embodiment. An implementation principle and a technical effect of the terminal are similar to those of the method embodiment, and details are not described herein again.

Optionally, the first location is a frequency domain location of a synchronization signal block or is determined based on first information, and the second location is a carrier central location or is determined based on second information.

Optionally, the first information is indicated by using a master information block.

Optionally, the second information is indicated by using a master information block, a system information block, or radio resource control signaling.

Optionally, the first bandwidth is not greater than a minimum terminal bandwidth capability, or is determined based on a minimum terminal bandwidth capability or based on a maximum carrier bandwidth, and the second bandwidth is determined based on the maximum carrier bandwidth.

Optionally, the first bandwidth is not greater than a minimum terminal bandwidth capability, or is determined based on a minimum terminal bandwidth capability or based on a maximum carrier bandwidth, and the second bandwidth is a size of a carrier bandwidth part.

Optionally, the maximum carrier bandwidth is determined based on a subcarrier spacing.

Optionally, the common information includes at least one piece of the following information: a reference signal for demodulating common control information, a reference signal for demodulating common data channel information, the common control information, and the common data channel information.

Optionally, the terminal-specific information includes at least one piece of the following information: a reference signal for demodulating terminal-specific control information, a reference signal for demodulating terminal-specific data channel information, and a channel measurement reference signal.

Figure 10:
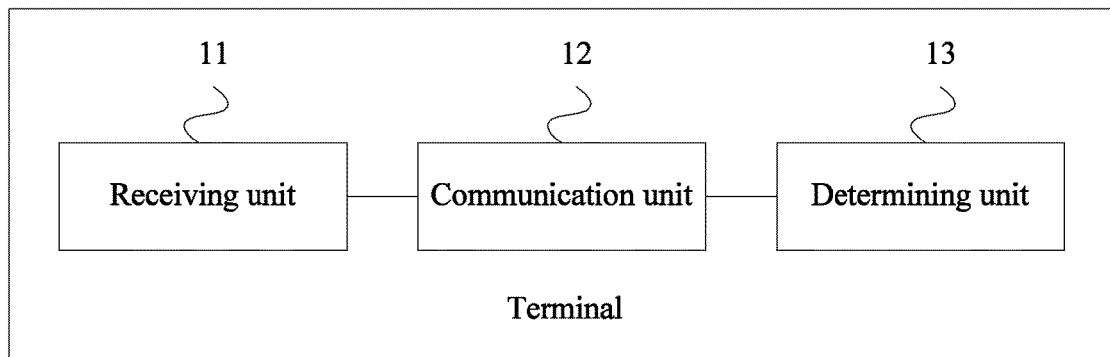
FIG. 10 is another schematic structural diagram of a terminal according to an embodiment of this application.

FIG. 10 is another schematic structural diagram of a terminal according to an embodiment of this application. Based on the embodiment shown in FIG. 9, in this embodiment of this application, the terminal further includes a determining module 13.

The determining module 13 determines, based on the second physical resource block index, a carrier bandwidth part for scheduling terminal-specific data channel information.

Optionally, the communication module 12 is further configured to transmit and/or receive, within the carrier bandwidth part, a physical resource for transmitting the terminal-specific data channel information.

The terminal provided in this embodiment of this application can perform the foregoing corresponding method embodiment. An implementation principle and a technical effect of the terminal are similar to those of the method embodiment, and details are not described herein again.

It should be noted that division of the foregoing units of the terminal is merely division of logical functions. In actual implementation, all or some of the units may be integrated into one physical entity, or may be physically separated. In addition, the units may be implemented in a form of software invoked by a processing element or in a form of hardware, or some units may be implemented in a form of software invoked by a processing element or in a form of hardware. For example, the sending unit may be an independently disposed processing element, or may be integrated into a chip of the terminal for implementation. In addition, the sending unit may be stored in a memory of the terminal as a program, and a processing element of the terminal invokes and executes a function of the sending unit. Implementation of another unit is similar to that of the sending unit. In addition, all or some of the units may be integrated together or may be implemented separately. The processing element herein may be an integrated circuit with a signal processing capability. In an implementation process, steps of the foregoing method or the foregoing units may be implemented by using an integrated logical circuit of hardware in the processor element, or by using an instruction in a form of software. In addition, the sending unit is a control sending unit, and may receive, by using a sending apparatus of the terminal such as an antenna and a radio frequency apparatus, information sent by a base station.

The foregoing units may be configured as one or more integrated circuits for implementing the foregoing method, for example, one or more application-specific integrated circuits (ASIC), one or more microprocessors (DSP), or one or more field programmable gate arrays (FPGA). For another example, when one of the units is implemented in a form of a processing element scheduling a program, the processing element may be a general-purpose processor, such as a central processing unit (CPU) or another processor that can invoke the program. For another example, the units may be integrated and implemented in a form of a System-On-a-Chip (SOC).

Figure 11:
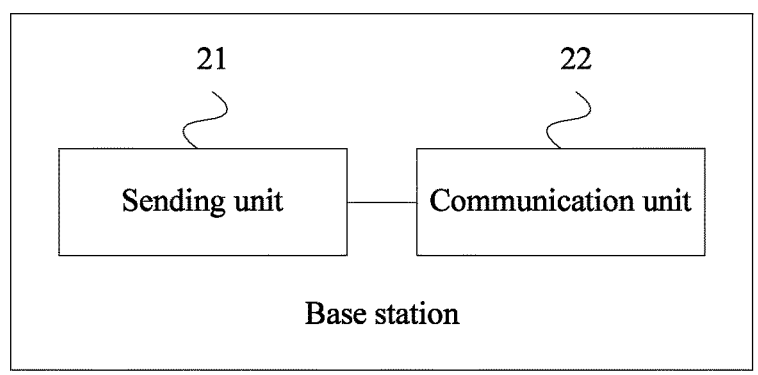
FIG. 11 is a schematic structural diagram of a base station according to an embodiment of this application.

FIG. 11 is a schematic structural diagram of a base station according to an embodiment of this application. Referring to FIG. 11, the base station includes a sending unit 21 and a communication unit 22.

The sending unit 21 is configured to send common information based on a first physical resource block index, and the first physical resource block index is determined based on a first bandwidth and/or a first location in frequency domain.

The communication unit 22 is configured to transmit and/or receive terminal-specific information based on a second physical resource block index, and the second physical resource block index is determined based on a second bandwidth and/or a second location in frequency domain.

The base station provided in this embodiment of this application can perform the foregoing corresponding method embodiment. An implementation principle and a technical effect of the base station are similar to those of the method embodiment, and details are not described herein again.

Optionally, the first location is a frequency domain location of a synchronization signal block or is determined based on first information, and the second location is a carrier central location or is determined based on second information.

Optionally, the first information is indicated by using a master information block.

Optionally, the second information is indicated by using a master information block, a system information block, or radio resource control signaling.

Optionally, the first bandwidth is not greater than a minimum terminal bandwidth capability, or is determined based on a minimum terminal bandwidth capability or based on a maximum carrier bandwidth, and the second bandwidth is determined based on the maximum carrier bandwidth.

Optionally, the first bandwidth is not greater than a minimum terminal bandwidth capability, or is determined based on a minimum terminal bandwidth capability or based on a maximum carrier bandwidth, and the second bandwidth is a size of a carrier bandwidth part.

Optionally, the maximum carrier bandwidth is determined based on a subcarrier spacing.

Optionally, the common information includes at least one piece of the following information: a reference signal for demodulating common control information, a reference signal for demodulating common data channel information, the common control information, and the common data channel information.

Optionally, the terminal-specific information includes at least one piece of the following information: a reference signal for demodulating terminal-specific control information, a reference signal for demodulating terminal-specific data channel information, and a channel measurement reference signal.

Figure 12:
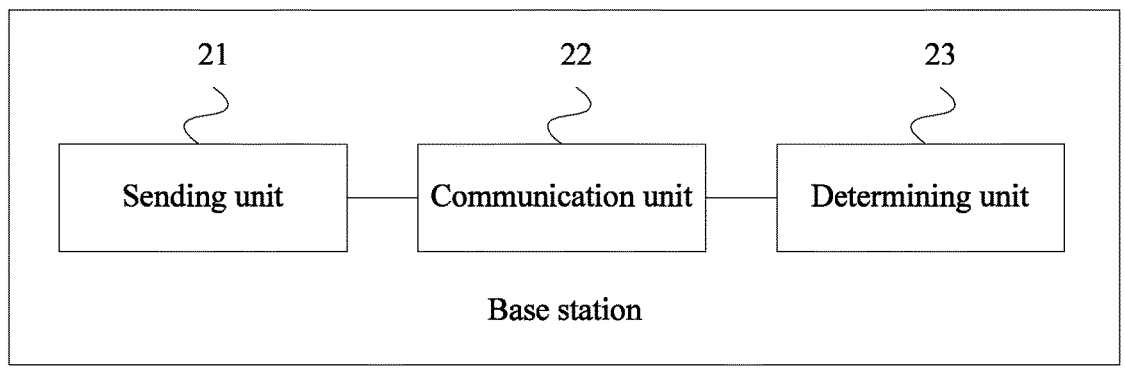
FIG. 12 is another schematic structural diagram of a base station according to an embodiment of this application.

FIG. 12 is another schematic structural diagram of a base station according to an embodiment of this application. Based on the embodiment shown in FIG. 11, in this embodiment of this application, the base station further includes a determining module 23.

The determining module 23 determines, based on the second physical resource block index, a carrier bandwidth part for scheduling terminal-specific data channel information.

Optionally, the communication module 22 is further configured to transmit and/or receive, within the carrier bandwidth part, a physical resource for transmitting the terminal-specific data channel information.

The base station provided in this embodiment of this application can perform the foregoing corresponding method embodiment. An implementation principle and a technical effect of the base station are similar to those of the method embodiment, and details are not described herein again.

It should be noted that division of the foregoing units of the base station is merely division of logical functions. In actual implementation, all or some of the units may be integrated into one physical entity, or may be physically separated. In addition, the units may be implemented in a form of software invoked by a processing element or in a form of hardware, or some units may be implemented in a form of software invoked by a processing element or in a form of hardware. For example, the sending unit may be an independently disposed processing element, or may be integrated into a chip of the base station for implementation. In addition, the sending unit may be stored in a memory of the base station as a program, and a processing element of the base station invokes and executes a function of the sending unit. Implementation of another unit is similar to that of the sending unit. In addition, all or some of the units may be integrated together or may be implemented separately. The processing element herein may be an integrated circuit with a signal processing capability. In an implementation process, steps of the foregoing method or the foregoing units may be implemented by using an integrated logical circuit of hardware in the processor element, or by using an instruction in a form of software. In addition, the sending unit is a control sending unit, and may receive, by using a sending apparatus of the base station such as an antenna and a radio frequency apparatus, information sent by a terminal.

The foregoing units may be configured as one or more integrated circuits for implementing the foregoing method, for example, one or more application-specific integrated circuits (ASIC), one or more microprocessors (digital signal processor, DSP), or one or more field programmable gate arrays (FPGA). For another example, when one of the units is implemented in a form of a processing element scheduling a program, the processing element may be a general-purpose processor, such as a central processing unit (CPU) or another processor that can invoke the program. For another example, the units may be integrated and implemented in a form of a System-On-a-Chip (SOC).

Figure 13:
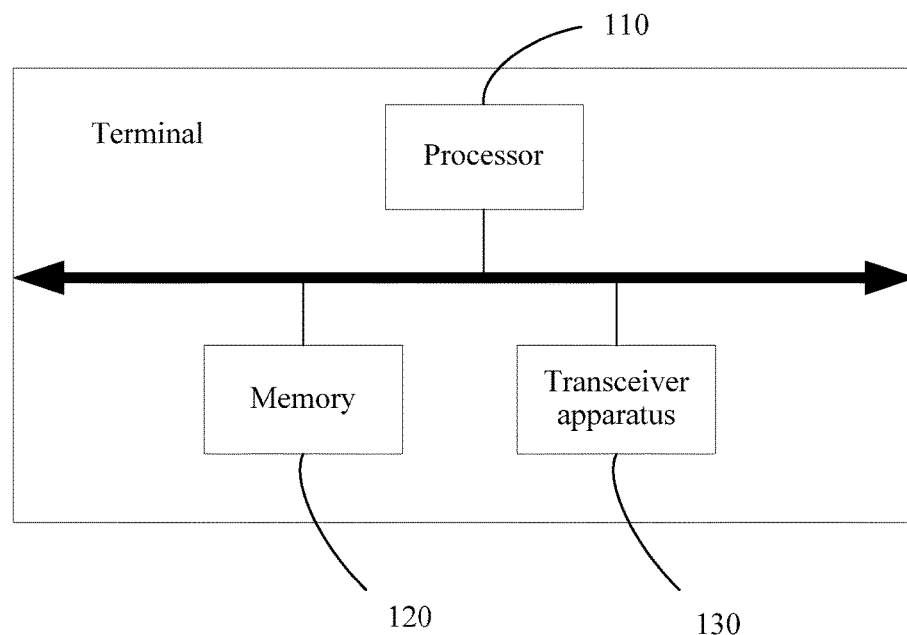
FIG. 13 is still another schematic structural diagram of a terminal according to an embodiment of this application.

FIG. 13 is still another schematic structural diagram of a terminal according to an embodiment of this application. As shown in FIG. 13, the terminal includes a processor 110, a memory 120, and a transceiver apparatus 130. The transceiver apparatus 130 may be connected to an antenna. In a downlink direction, the transceiver apparatus 130 receives, by using the antenna, information sent by a base station, and sends the information to the processor 110 for processing. In an uplink direction, the processor 110 processes data of the terminal, and sends the data to the base station by using the transceiver apparatus 130.

The memory 120 is configured to store a program for implementing the foregoing method embodiment or the units in the embodiments shown in FIG. 9 and FIG. 10, and the processor 110 invokes the program to perform operations in the foregoing method embodiment, to implement the units shown in FIG. 9 and FIG. 10.

Alternatively, some or all of the foregoing units may be implemented by using an integrated circuit that is embedded in a chip of the terminal. The units may be implemented separately or may be integrated together. The foregoing units may be configured as one or more integrated circuits for implementing the foregoing method, for example, one or more application-specific integrated circuits (ASIC), one or more microprocessors (digital signal processor, DSP), or one or more field programmable gate arrays (FPGA).

Figure 14:
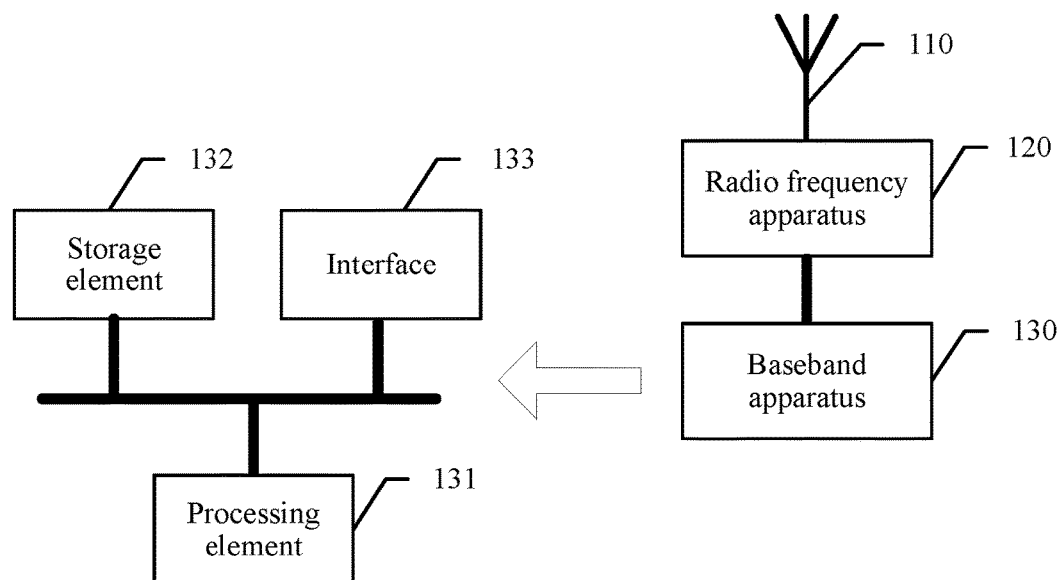
FIG. 14 is still another schematic structural diagram of a base station according to an embodiment of this application.

FIG. 14 is still another schematic structural diagram of a base station according to an embodiment of this application. As shown in FIG. 14, the base station includes an antenna 110, a radio frequency apparatus 120, and a baseband apparatus 130. The antenna 110 is connected to the radio frequency apparatus 120. In an uplink direction, the radio frequency apparatus 120 receives, by using the antenna 110, information sent by a terminal, and sends, to the baseband apparatus 130 for processing, the information sent by the terminal. In a downlink direction, the baseband apparatus 130 processes the information of the terminal and sends the information to the radio frequency apparatus 120, and the radio frequency apparatus 120 processes the information of the terminal and then sends the information to the terminal by using the antenna 110.

In an implementation, the foregoing units are implemented in a form of a processing element scheduling a program. For example, the baseband apparatus 130 includes a processing element 131 and a storage element 132, and the processing element 131 invokes a program stored in the storage element 132, to perform the method in the foregoing method embodiment. In addition, the baseband apparatus 130 may further include an interface 133, configured to exchange information with the radio frequency apparatus 120. The interface is, for example, a common public radio interface (CPRI).

In another implementation, the foregoing units may be configured as one or more processing elements for implementing the foregoing method. These processing elements are disposed on the baseband apparatus 130. The processing element herein may be an integrated circuit, for example, one or more ASICs, one or more DSPs, or one or more FPGAs. These integrated circuits may be integrated together to form a chip.

For example, the foregoing units may be integrated in a form of a System-On-a-Chip (SOC). For example, the baseband apparatus 130 includes an SOC chip, and the SOC chip is configured to implement the foregoing method. The processing element 131 and the storage element 132 may be integrated into the chip, and the processing element 131 invokes the program stored in the storage element 132, to implement the foregoing method or functions of the foregoing units. Alternatively, at least one integrated circuit may be integrated in the chip to implement the foregoing method or functions of the foregoing units. Alternatively, the foregoing implementations may be combined, functions of some units are implemented by a processing element invoking a program, and functions of some units are implemented by using an integrated circuit.

Regardless of a manner, the base station includes at least one processing element, a storage element, and a communications interface, and the at least one processing element is configured to perform the method provided in the foregoing method embodiment. The processing element may perform some or all of the steps in the foregoing method embodiment in a first manner of executing the program stored in the storage element, or in a second manner of using an integrated logic circuit of hardware in the processor element. Certainly, the method provided in the foregoing method embodiment may alternatively be performed by combining the first manner with the second manner.

Similar to the foregoing description, the processing element herein may be a general-purpose processor such as a central processing unit (CPU), or may be configured as one or more integrated circuits for implementing the foregoing method, for example, one or more application-specific integrated circuits (ASIC), one or more microprocessors (digital signal processor, DSP), or one or more field programmable gate arrays (FPGA).

The storage element may be a memory, or may be a general term of a plurality of storage elements.

This application further provides a storage medium, including a readable storage medium and a computer program, and the computer program is used to implement the data communication method provided in any one of the foregoing embodiments.

This application further provides a program product, the program product includes a computer program (that is, an execution instruction), and the computer program is stored in a readable storage medium. At least one processor of a terminal may read the computer program from the readable storage medium, and the at least one processor executes the computer program, so that the terminal performs the data communication method provided in the foregoing implementations.

An embodiment of this application further provides a data communication apparatus, including at least one storage element and at least one processing element. The at least one storage element is configured to store a program, and when the program is executed, the data communication apparatus performs an operation of the terminal in any one of the foregoing embodiments. The apparatus may be a terminal chip.

This application further provides a storage medium, including a readable storage medium and a computer program, and the computer program is used to implement the data communication method provided in any one of the foregoing embodiments.

This application further provides a program product, the program product includes a computer program (that is, an execution instruction), and the computer program is stored in a readable storage medium. At least one processor of a base station may read the computer program from the readable storage medium, and the at least one processor executes the computer program, so that the base station performs the data communication method provided in the foregoing implementations.

An embodiment of this application further provides a data communication apparatus, including at least one storage element and at least one processing element. The at least one storage element is configured to store a program, and when the program is executed, the data communication apparatus performs an operation of the base station in any one of the foregoing embodiments. The apparatus may be a base station chip.

All or some of the steps in the foregoing method embodiments may be implemented by a program instructing relevant hardware. The foregoing program may be stored in a computer-readable memory. When the program is executed, the steps in the foregoing method embodiments are performed. The memory (storage medium) includes: a read-only memory (ROM for short), a RAM, a flash memory, a hard disk, a solid state disk, a magnetic tape, a floppy disk, an optical disc, and any combination thereof.

What is claimed is:

1. A method, comprising:
    receiving, by a terminal, a master information block, wherein the master information block comprises first information, and the first information indicates a first lowest subcarrier of a first physical resource block, wherein the first physical resource block is a lowest physical resource block of a sub-band on which a system information block is located;
    determining, by the terminal, a first physical resource block index based on the first lowest subcarrier;
    receiving, by the terminal, a first demodulation reference signal based on the first physical resource block index, wherein the first demodulation reference signal is used to demodulate a first data channel on which the system information block is located;
    receiving, by the terminal, the system information block or radio resource control signaling, wherein the system information block or the radio resource control signaling comprises second information which indicates a second lowest subcarrier of a second physical resource block;
    determining, by the terminal, a second physical resource block index based on the second lowest subcarrier; and
    sending or receiving, by the terminal, a second demodulation reference signal based on the second physical resource block index, wherein the second demodulation reference signal is used to demodulate a second data channel.

2. The method according to claim 1, wherein the second data channel is a data channel other than the first data channel on which the system information block is located.

3. The method according to claim 1, wherein sending or receiving the second demodulation reference signal based on the second physical resource block index comprises:
    after receiving the system information block, sending or receiving, by the terminal, the second demodulation reference signal based on the second physical resource block index.

4. The method according to claim 1, wherein the first information indicates an offset between a frequency domain location of the first lowest subcarrier and a frequency domain location of a synchronization signal block, and the second information indicates an offset between a frequency domain location of the second lowest subcarrier and the frequency domain location of the synchronization signal block.

5. The method according to claim 1, wherein the first lowest subcarrier is subcarrier 0 of the first physical resource block.

6. The method according to claim 1, wherein the second data channel comprises a terminal-specific data channel.

7. The method according to claim 6, wherein the terminal-specific data channel comprises an uplink data channel or a downlink data channel.

8. A method, comprising:
    receiving, by a terminal, a master information block, wherein the master information block comprises first information, the first information indicates a first lowest subcarrier of a first physical resource block, and the first physical resource block is a lowest physical resource block of a sub-band on which a system information block is located;
    determining, by the terminal, a first physical resource block index based on the first lowest subcarrier;
    receiving, by the terminal, a first demodulation reference signal based on the first physical resource block index, wherein the first demodulation reference signal is used to demodulate a first downlink control channel for scheduling a data channel on which the system information block is located;
    receiving, by the terminal, the system information block or radio resource control signaling, wherein the system information block or the radio resource control signaling comprises second information which indicates a second lowest subcarrier of a second physical resource block;
    determining, by the terminal, a second physical resource block index based on the second lowest subcarrier; and
    receiving, by the terminal, a second demodulation reference signal based on the second physical resource block index, wherein the second demodulation reference signal is used to demodulate a second downlink control channel.

9. The method according to claim 8, wherein the second downlink control channel is a downlink control channel other than the first downlink control channel.

10. The method according to claim 8, wherein the second downlink control channel comprises a common downlink control channel or a terminal-specific control channel.

11. The method according to claim 8, wherein receiving the second demodulation reference signal based on the second physical resource block index comprises:
    after establishing a connection to a base station, receiving, by the terminal, the second demodulation reference signal based on the second physical resource block index.

12. The method according to claim 8, wherein the first information indicates an offset between a frequency domain location of the first lowest subcarrier and a frequency domain location of a synchronization signal block, and the second information indicates an offset between a frequency domain location of the second lowest subcarrier and the frequency domain location of the synchronization signal block.

13. The method according to claim 8, wherein the first lowest subcarrier is subcarrier 0 of the first physical resource block.

14. The method according to claim 8, wherein the first downlink control channel is used to schedule common information, and the common information comprises the system information block.

15. An apparatus, comprising:
    a processor; and
    a non-transitory memory, wherein the memory is configured to store a program; and
    wherein the processor is configured to execute the program stored in the memory, to:
        receive a master information block, wherein the master information block comprises first information, the first information indicates a first lowest subcarrier of a first physical resource block, and the first physical resource block is a lowest physical resource block of a sub-band on which a system information block is located;

determine a first physical resource block index based on the first lowest subcarrier;

receive a first demodulation reference signal based on the first physical resource block index, wherein the first demodulation reference signal is used to demodulate a first data channel on which the system information block is located;

receive the system information block or radio resource control signaling, wherein the system information block or the radio resource control signaling comprises second information indicating a second lowest subcarrier of a second physical resource block;

determine a second physical resource block index based on the second lowest subcarrier; and send or receive a second demodulation reference signal based on the second physical resource block index, wherein the second demodulation reference signal is used to demodulate a second data channel.

16. The apparatus according to claim 15, wherein the second data channel is a data channel other than the first data channel on which the system information block is located.

17. The apparatus according to claim 15, wherein sending or receiving the second demodulation reference signal based on the second physical resource block index comprises:

after receiving the system information block, sending or receiving the second demodulation reference signal based on the second physical resource block index.

18. The apparatus according to claim 15, wherein the first information indicates an offset between a frequency domain location of the first lowest subcarrier and a frequency domain location of a synchronization signal block, and the second information indicates an offset between a frequency domain location of the second lowest subcarrier and the frequency domain location of the synchronization signal block.

19. The apparatus according to claim 15, wherein the first lowest subcarrier is subcarrier 0 of the first physical resource block.

20. The apparatus according to claim 15, wherein the second data channel comprises a terminal-specific data channel.

21. The apparatus according to claim 20, wherein the terminal-specific data channel comprises an uplink data channel or a downlink data channel.

22. The apparatus according to claim 15, wherein the apparatus is a terminal.

23. An apparatus, comprising:
a processor; and
a non-transitory memory, wherein the memory is configured to store a program; and
wherein the processor is configured to execute the program stored in the memory to:
receive a master information block, wherein the master information block comprises first information, the first information indicates a first lowest subcarrier of a first physical resource block, and the first physical resource block is a lowest physical resource block of a sub-band on which a system information block is located;

determine a first physical resource block index based on the first lowest subcarrier;

receive a first demodulation reference signal based on the first physical resource block index, wherein the first demodulation reference signal is used to demodulate a first downlink control channel for scheduling a data channel on which the system information block is located;

receive the system information block or radio resource control signaling, wherein the system information block or the radio resource control signaling comprises second information indicating a second lowest subcarrier of a second physical resource block;

determine a second physical resource block index based on the second lowest subcarrier; and receive a second demodulation reference signal based on the second physical resource block index, wherein the second demodulation reference signal is used to demodulate a second downlink control channel.

24. The apparatus according to claim 23, wherein the second downlink control channel is a downlink control channel other than the first downlink control channel.

25. The apparatus according to claim 23, wherein the second downlink control channel comprises a common downlink control channel or a terminal-specific control channel.

26. The apparatus according to claim 23, wherein receiving the second demodulation reference signal based on the second physical resource block index comprises:

after establishing a connection to a base station, receiving the second demodulation reference signal based on the second physical resource block index.

27. The apparatus according to claim 23, wherein the first information indicates an offset between a frequency domain location of the first lowest subcarrier and a frequency domain location of a synchronization signal block, and the second information indicates an offset between a frequency domain location of the second lowest subcarrier and the frequency domain location of the synchronization signal block.

28. The apparatus according to claim 23, wherein the first lowest subcarrier is subcarrier 0 of the first physical resource block.

29. The apparatus according to claim 23, wherein the first downlink control channel is used to schedule common information, and the common information comprises the system information block.

30. The apparatus according to claim 23, wherein the apparatus is a terminal.

* * * * *